United States Patent
Ebisawa

(10) Patent No.: US 6,246,799 B1
(45) Date of Patent: Jun. 12, 2001

(54) IMAGE COMPRESSION ENCODER AND IMAGE COMPRESSION ENCODING METHOD

(75) Inventor: Kan Ebisawa, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/066,434
(22) PCT Filed: Sep. 4, 1997
(86) PCT No.: PCT/JP97/03107
§ 371 Date: Aug. 3, 1998
§ 102(e) Date: Aug. 3, 1998
(87) PCT Pub. No.: WO98/10592
PCT Pub. Date: Mar. 12, 1998

(30) Foreign Application Priority Data

Sep. 4, 1996 (JP) .................................................. 8-252205

(51) Int. Cl.[7] ............................................................ G06K 9/36
(52) U.S. Cl. ............................................................... 382/243
(58) Field of Search .................................. 382/232, 235, 382/236, 238, 239, 242; 358/453, 538, 464, 467

(56) References Cited

U.S. PATENT DOCUMENTS

| | | | |
|---|---|---|---|
| 5,592,228 | * 1/1997 | Dachiku et al. | 382/241 |
| 5,598,215 | * 1/1997 | Watanabe | 382/242 |
| 5,598,216 | * 1/1997 | Lee | 382/241 |
| 5,666,212 | * 9/1997 | Gilge | 382/242 |
| 5,675,669 | * 10/1997 | Kim | 382/242 |
| 5,845,012 | * 12/1998 | Jung | 382/242 |
| 5,881,175 | * 3/1999 | Kim | 382/242 |
| 5,896,467 | * 4/1999 | Kim | 382/242 |
| 6,014,173 | * 1/2000 | Miyamoto | 382/236 |

FOREIGN PATENT DOCUMENTS

| | | |
|---|---|---|
| 53-35313 | 4/1978 | (JP) . |
| 2-100488 | 4/1990 | (JP) . |
| 2-119464 | 5/1990 | (JP) . |

* cited by examiner

Primary Examiner—Jose L. Couso
(74) Attorney, Agent, or Firm—Frommer Lawrence & Haug, LLP.; William S. Frommer; Darren M. Simon

(57) ABSTRACT

A position detecting section 20 detects visual point position of operator on the basis of output of a bisected light detector 2 in an eyeball movement measurement element. A position processing section 21 determines central position of a visual point position vicinity area on the basis of information from the position detecting section 20, and a size processing section 23 determines size of the visual point position vicinity area on the basis of output of a size adjust lever 18. A video signal 10 is encoded by a compressing section 11 and is inputted to a code quantity reduction section 13. A system control section 30 controls the code quantity reduction section 13 so that code quantity allocated to the area except for the visual point position vicinity area is smaller than code quantity allocated to the visual point position vicinity area to allow it to carry out reduction of code quantity. Thus, picture data can be compressed and encoded on the real time basis within a limited code quantity, and there can be obtained picture of high picture quality from a viewpoint of visual sense for user as far as possible at the time of decoding.

24 Claims, 19 Drawing Sheets

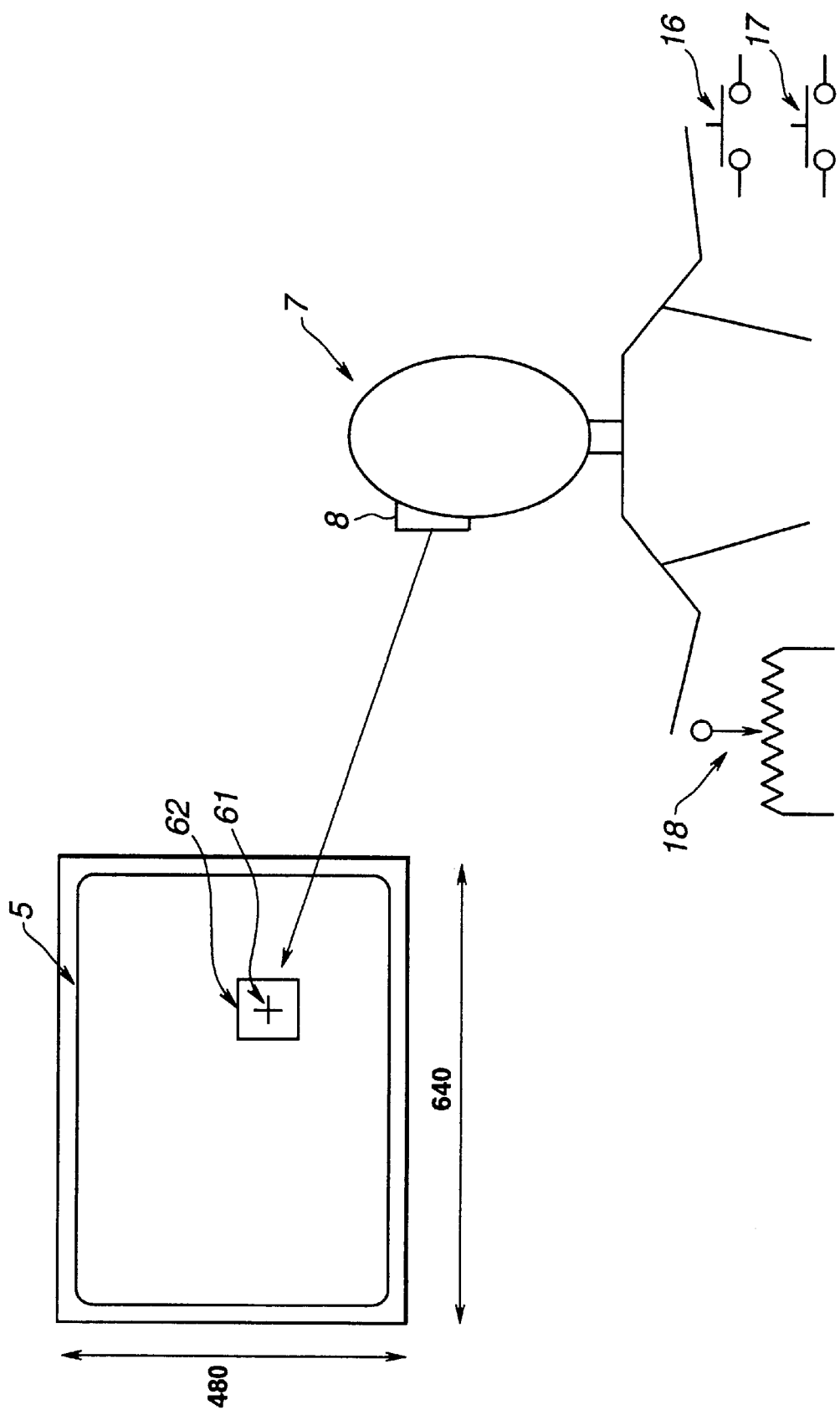

IMAGE COMPRESSION ENCODER AND IMAGE COMPRESSION ENCODING METHOD

TECHNICAL FIELD

This invention relates to a picture compression encoding apparatus and a picture compression encoding method for compression-encoding picture data.

BACKGROUND ART

In recent years, with realization of image in digital form and progress of picture compression technology, various picture compression encoding processing have been carried out. However, in the prior art, code quantity allocated to picture data of a predetermined unit is fixed to a certain fixed quantity (in the case of the fixed rate), or even in the case of a variable rate to vary code quantity allocated to picture data of a predetermined unit in dependency upon fineness of picture, code quantity allocated at the maximum has been already determined. Therefore, the maximum value of code quantity within a predetermined time is determined. As a result, when continuous complicated pictures are successive, there was limitation in the code quantity. As a matter of course, increase or decrease of code quantity allocated to the picture leads to degree of the picture quality. In view of the above, in the prior art, it has been carried out to control code quantity so that the picture quality deterioration at the time of decoding becomes minimum while taking the same code quantity as the entirety of a single picture by a method of allocating a larger code quantity to complicated portions on the picture, etc.

However, way of sensing of the picture quality deterioration of viewer (viewer/listener) is changed to what portion attention is drawn within one picture. On the other hand, the portion that the viewer carefully observes is the portion important within that picture, and that portion is not limited to the complicated portion within that picture. For this reason, with the method of allocating a larger code quantity to the complicated portion on picture, inconvenience as described below takes place. Namely, in the case where, e.g., the main person exists within the complicated background, etc., larger codes are allocated to the complicated background. As a result, the code quantity allocated to the main person that the viewer carefully observes is less. Thus, the viewer feels picture quality deterioration at the time of decoding.

To cope with this, it is conceivable that the operator is permitted to arbitrarily change, every picture, allocation of code quantity within the picture. However, it is necessary to take much labor in order to allow the operator to set area different in allocation of code quantity, and in situations where real time characteristic such as live broadcasting, etc. is required, such an operation is impossible.

Meanwhile, in the Japanese Patent Application Laid Open No. 44110/1995 publication, there is disclosed the technology in which position of visual point of user is detected to display a predetermined area in the vicinity of the visual point position within one picture by high resolution, and to display other area by low resolution. In other words, it can be said that this technology is the technology in which code quantity allocated to the area in the vicinity of the visual point position within one picture is increased and code quantity allocated to other area is decreased. In accordance with this technology, picture quality deterioration that the user feels at the time of decoding can be suppressed while encoding respective pictures on the real time basis within a limited code quantity.

However, in the case where such an approach is always employed to increase code quantity allocated to the area in the vicinity of the visual point and to decrease code quantity allocated to other area, even if other area is not so complicated and code quantity to be allocated is not decreased, even in the case where quantity of codes generated is not so many, i.e., there is margin in the code quantity, there is the problem that quantity of codes allocated to other area is necessarily reduced and the picture quality of other area is unnecessarily deteriorated.

Moreover, the size of the area that the viewer carefully observes within picture is not limited to fixed size. Accordingly, in the case where the size of the area where quantity of codes allocated is increased is caused to be fixed (constant), problems as described below takes place. Namely, in the case where the area that the viewer carefully observes is larger than the area where code quantity is increased, larger code quantity is allocated in the area of the center side of the area that the viewer carefully observes so that there results small deterioration of the picture quality. In the area of the peripheral side of the area where the viewer carefully observes, code quantity to be allocated becomes small. As a result, deterioration of the picture quality becomes large. Thus, there results picture difficult to see for the viewer, i.e., picture of which picture quality has been deteriorated. To the contrary, in the case where the area where the viewer carefully observes is smaller than the area where the code quantity is increased, a large code quantity would be allocated also to the area except for the area where the viewer carefully observes. As a result, there may take place circumstances where code quantity allocated to the area where the viewer carefully observes becomes small.

This invention has been made in view of the problems as described above, and its object is to provide a picture compression encoding apparatus and a picture compression encoding method which are capable of compression-encoding picture data on the real time basis within a limited code quantity, and is permitted to obtain picture (image) having high picture quality from a viewpoint of visual sense for user as far as possible at the time of decoding.

DISCLOSURE OF THE INVENTION

A picture compression encoding apparatus of this invention comprises: encoding means for compression-encoding input picture data; visual point position detecting means for detecting visual point position on a picture based on the input picture data; area setting means for setting a visual point position vicinity area in the vicinity of a visual point position detected by the visual point position detecting means; and code quantity limiting means such that when code quantity generated by the encoding means is above a predetermined quantity, it limits code quantity generated by the encoding means so that code quantity allocated to the area except for the visual point position vicinity area set by the area setting means is smaller than code quantity allocated to the visual point position vicinity area.

In such a configuration, visual point position of operator on picture based on input picture data is detected by the visual point position detecting means, and visual point position vicinity area is set in the vicinity of the visual point position detected by the visual point position detecting means on the picture based on the input picture data. Moreover, input picture data is compression-encoded by the encoding means, and code quantity generated by the encoding means is limited by the code quantity limiting means by varying allocation of code quantity in dependency upon the area so that code quantity allocated to the area except for the visual point position vicinity area set by the area setting means is smaller than code quantity allocated to the visual point position vicinity area only when code quantity per predetermined time generated by the encoding means is above a predetermined quantity in the case where code quantity is not limited. Accordingly, when there is margin in the code quantity, there is no possibility that the picture quality may be unnecessarily deteriorated. Thus, there are provided the effects/advantages that picture data can be compression-encoded on the real time basis within a limited code quantity and there can be obtained picture (image) having high picture quality from a viewpoint of visual sense for user as far as possible at the time of decoding.

Further, a picture compression encoding apparatus of this invention comprises: encoding means for compression-encoding input picture data; visual point position detecting means for detecting visual point position on a picture based on the input picture data; area setting means for setting visual point position vicinity area in the vicinity of the visual point position detected by the visual point position detecting means; code quantity limiting means for limiting allocation of code quantity in dependency upon the visual point position vicinity area so that code quantity allocated to the area except for the visual point position vicinity area set by the area setting means is smaller than code quantity allocated to the visual point position vicinity area; and area adjustable means for changing size of the visual point position vicinity area set by the area setting means.

In such a configuration, visual point position of operator on a picture based on input picture data is detected by visual point position detecting means, and visual point position vicinity area is set in the vicinity of the visual point position detected by the visual point position detecting means on a picture based on input picture data. Size of this visual point position vicinity area is changed by area size adjustable means. Moreover, input picture data is compression-encoded by the encoding means, and code quantity generated by the encoding means is limited by varying allocation of code quantity in dependency upon the area so that code quantity allocated to the area except for the visual point position vicinity area set by the area setting means is smaller than code quantity allocated to the visual point position vicinity area. Accordingly, the area where large code quantity is allocated can be set to suitable size. Thus, there can be provided the effects/advantages that picture data can be compression-encoded on the real time basis within a limited code quantity, and there can be obtained picture (image) having high picture quality from a viewpoint of visual sense for user as far as possible at the time of decoding.

In this case, it is preferable that the code quantity limiting means decreases stepwise code quantity allocated to the area except for the visual point position vicinity area toward a direction away from the visual point position vicinity area. Thus, it is possible to avoid that the boundary portion of the visual point position vicinity area becomes conspicuous. As a result, picture (image) of higher picture quality from a viewpoint of visual sense can be obtained.

Moreover, it is preferable to further comprise selector means for selecting whether or not it is carried out to vary allocation of code quantity in dependency upon the area by the quantity limiting means. Thus, operator can select whether or not he carries out change of allocation of code quantity in dependency upon the area as occasion demands. As a result, convenience in use can be improved.

Further, the area setting means may be adapted so that when visual point positions are intermittently detected by the visual point position detecting means, visual point position vicinity areas are set continuously in point of time between detection time points of respective visual point positions. Thus, e.g., also in the case where operator repeatedly carefully observes plural portions within picture with the visual point being changed in succession, visual point position vicinity areas can be set continuously in point of time respectively in the vicinity of plural portions where he carefully observes. As a result, picture (image) of higher picture quality from a viewpoint of visual sense can be obtained.

Furthermore, the area setting means may be adapted so that the visual point position vicinity areas can be continuously set between the time point when visual point position is first detected by the visual point position detecting means within picture unit consisting of plural frames or plural fields and the time when the picture unit is started. Moreover, the area setting means may be adapted so that the visual point position vicinity areas are continuously set between the time point when the visual point position is detected last by the visual point position detecting means within picture unit consisting of plural frames or plural fields and the time when the picture unit is completed. Thus, also when the visual point position is not stable after change of scene or before change thereof, the visual point position vicinity area can be set. As a result, picture (image) of higher picture quality from a viewpoint of visual sense can be obtained.

BRIEF DESCRIPTION OF THE DRAWINGS

FIG. 6 is an explanatory view for explaining operation by operator at the time of encoding of video signal in the picture compression encoding apparatus according to the embodiment of this invention.

BEST MODE FOR CARRYING OUT THE INVENTION

Preferred embodiments according to this invention will be described below with reference to the attached drawings.

In a picture compression encoding apparatus according to this embodiment, an eyeball movement measurement element is used as visual point position detecting means for detecting visual point position of operator on picture based on input picture data. Initially, this eyeball movement measurement element will be described.

Figure 3A:
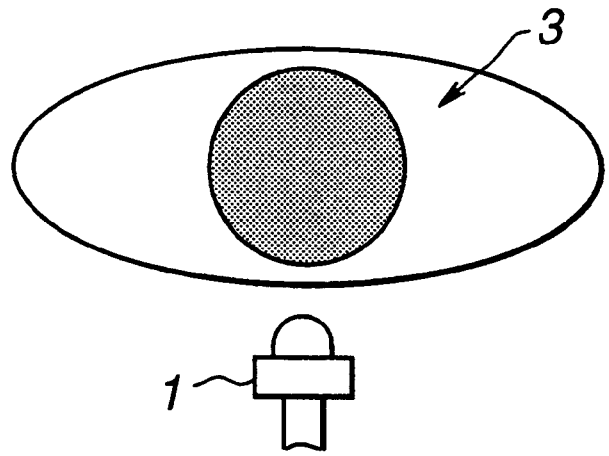
FIG. 3 is an explanatory view showing the configuration of an eyeball movement measurement element utilized in the picture compression encoding apparatus according to the embodiment of this invention.
Figure 3B:
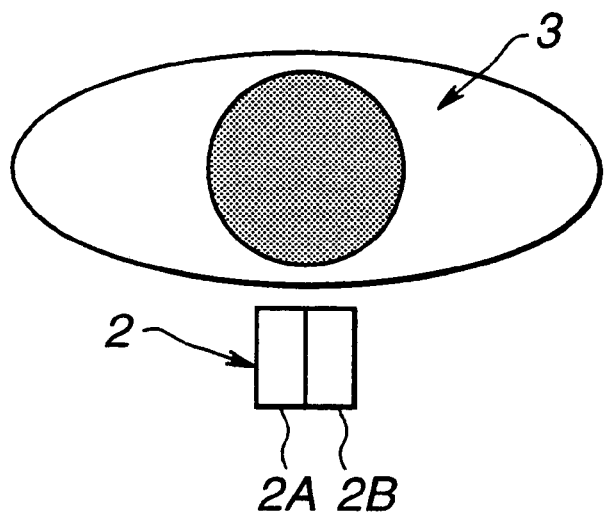

FIG. 3 is an explanatory view showing the configuration of the eyeball movement measurement element. This eyeball movement measurement element comprises a light emitting diode (hereinafter referred to as LED) for emitting light of infrared rays, and a bisected light (photo) detector 2 including light receiving potions 2A, 2B bisected in a horizontal direction. While the LED 1 and the bisected light detector 2 are separately indicated for convenience in FIGS. 3A and 3B, these members are integrated and held from a practical point of view so that they are disposed at the position of the lower side of the central portion of an eyeball 3 by holding member in goggle form. In this example, the bisected light detector 2 is adapted so that when operator affixes the holding member, the light receiving portion 2A is disposed at the right side when viewed from the operator and the light receiving portion 2B is disposed at the left side when viewed from the operator. When the operator affixes the holding member, the LED 1 irradiates infrared rays from the position outside the visual field of the lower side of the eyeball 3 toward the eyeball 3 as shown in FIG. 3A, and the bisected light detector 2 detects reflected light from the eyeball 3 as shown in FIG. 3B.

Figure 4A:
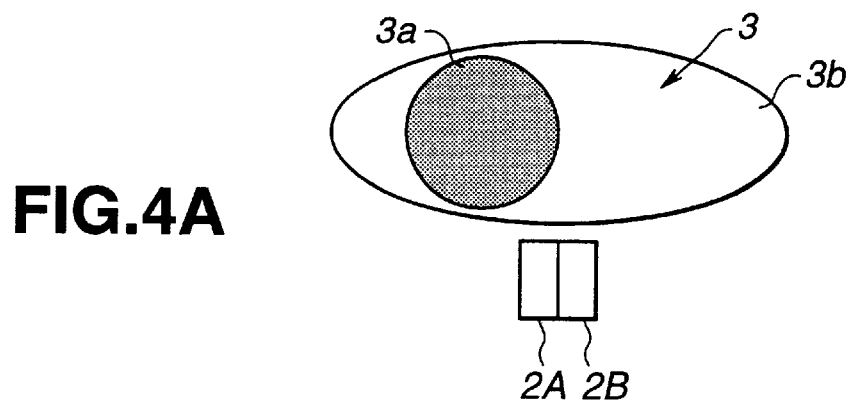
FIG. 4 is an explanatory view for explaining the principle of operation of the eyeball movement measurement element shown in FIG. 3.
Figure 4B:
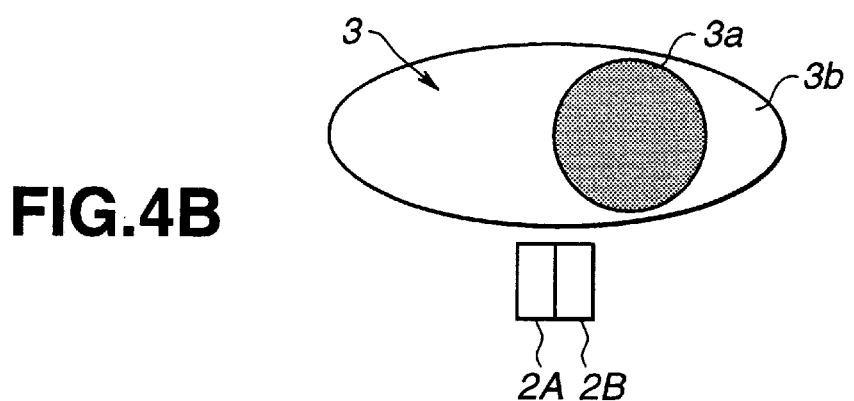

The operation principle of the eyeball movement measurement element shown in FIG. 3 will now be described with reference to FIG. 4. FIG. 4A shows the state of the eyeball 3 when the visual point of operator is moved in a right direction. Since the eyeball central portion (iris of the eye) 3a has small reflection factor of light as compared to the eyeball peripheral portion (the white of the eye) 3b, light quantity returning to the light receiving portion 2A is smaller as compared to light quantity returning to the light receiving portion 2B in the state shown in FIG. 4A. FIG. 4B shows the state of the eyeball 3 when visual point of operator is moved in a left direction. In this state, light quantity returning to the light receiving portion 2B becomes smaller as compared to light quantity returning to the light receiving portion 2A. Accordingly, it becomes possible to detect movement in the horizontal direction of the eyeball 3, in other words, movement in the horizontal direction of the visual point from difference between output of the light receiving portion 2A and output of the light receiving portion 2B.

Figure 4C:
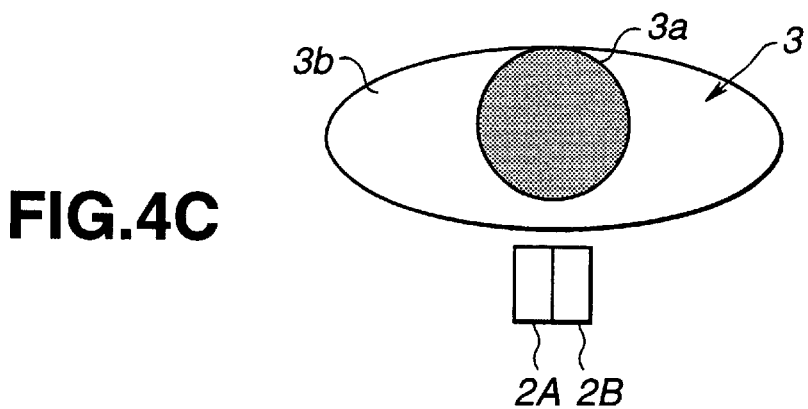
Figure 4D:
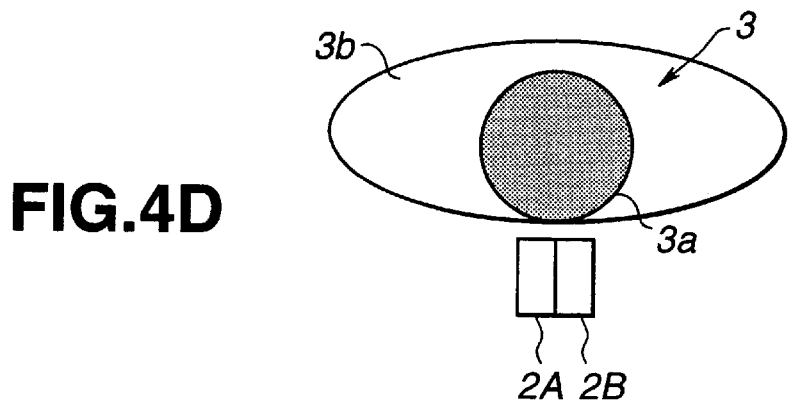

FIG. 4C shows the state of the eyeball 3 when the visual point of operator is moved in an upper direction. In this state, respective rays of light returning to the light receiving portions 2A, 2B are both increased. FIG. 4D shows the state of the eyeball 3 when the visual point of operator is moved in a lower direction. In this state, respective rays of light returning to the light receiving portions 2A, 2B are both decreased. Accordingly, it is possible to detect movement in the vertical direction of the eyeball 3, in other words, movement in the vertical direction of the visual point from sum of output of the light receiving portion 2A and output of the light receiving portion 2B.

In this way, position of the visual point of operator can be detected from difference between outputs of the light receiving portions 2A, 2B and sum thereof. While the operation principle of the eyeball movement measurement element has been described above, since reflected light quantity at the eyeball 3 changes every operators in practice, such an approach is employed to fix position of the head of operator to allow him to carefully observe positions of several points determined in advance on picture to carry out correction of visual point position (hereinafter referred to as visual point correction) on the basis of outputs of the light receiving portions 2A, 2B at that time.

Figure 5:
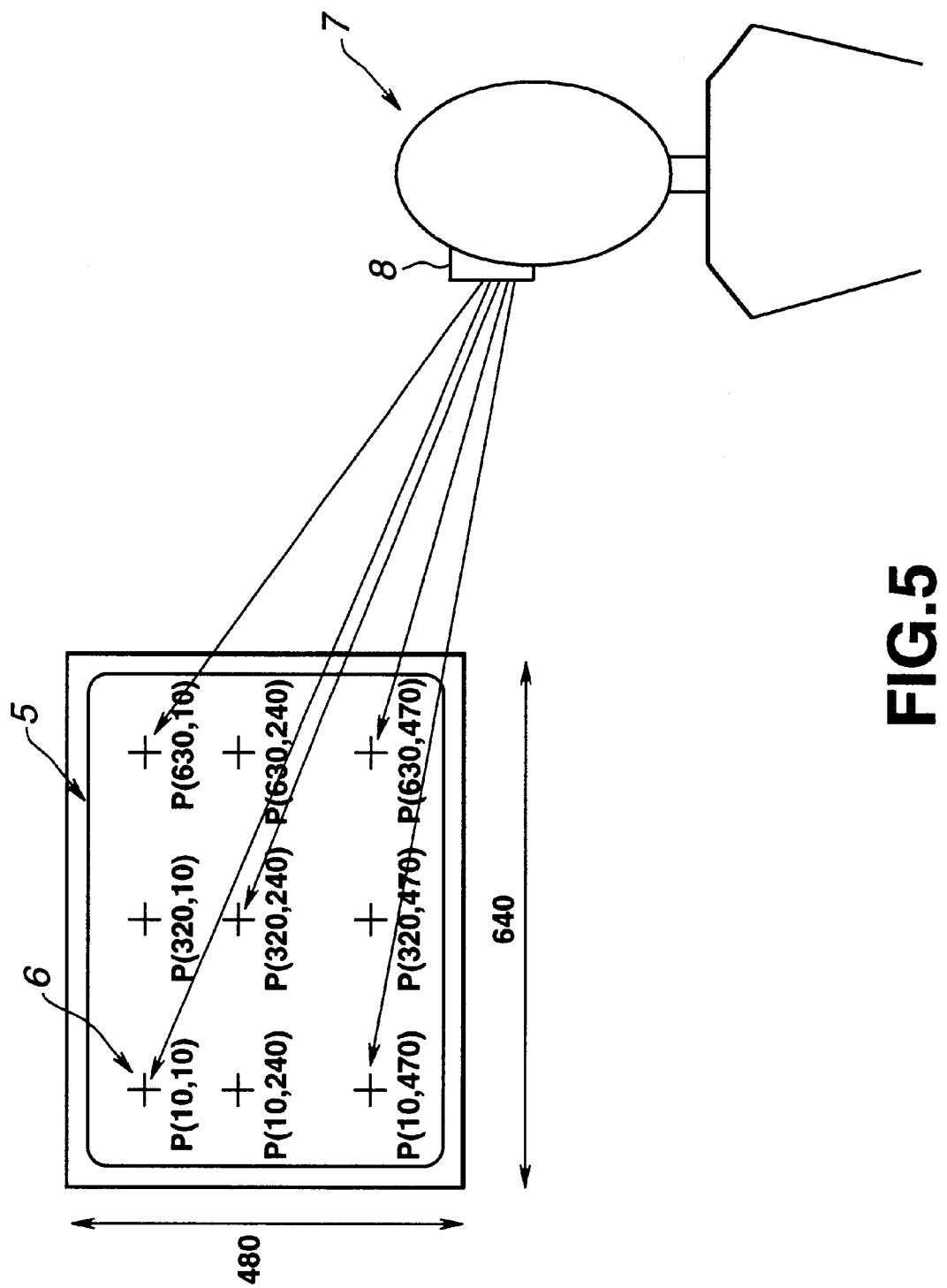
FIG. 5 is an explanatory view for explaining an outline of visual point correction in the picture compression encoding apparatus according to the embodiment of this invention.
Figure 7A:
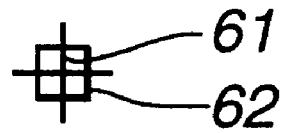
FIG. 7 is an explanatory view showing marker displayed on monitor screen in the picture compression encoding apparatus according to the embodiment of this invention.
Figure 7B:
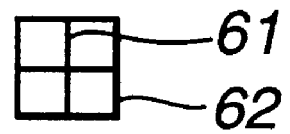
Figure 7C:
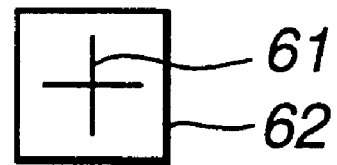
Figure 7D:
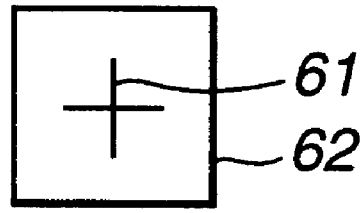

Outline of the visual point correction will now be described with reference to FIG. 5. In this case, the portion in the lateral direction (x-direction) on picture 5 is divided into 640 sections and the portion in the longitudinal direction (y-direction) is divided into 480 sections. When the left and upper portion of the picture 5 is assumed to be origin, position in the lateral direction is represented by m, position in the longitudinal direction is represented by n, and position of an arbitrary point on the picture is represented by P (m, n). At the time of visual point correction, markers 6 are displayed in succession at, e.g., at nine points described below, i.e., P(10, 10), P(320, 10), P(630, 10), P(10, 240), P(320, 240), P(630, 240), P(10, 470), P(320, 470) and P(630, 470) to allow operator 7 who has affixed holding member 8 to which the eyeball movement measurement element has been attached to carefully observe respective points indicated by markers 6. Thus, visual point correction is carried out on the basis of outputs of the light receiving portions 2A, 2B at that time.

Figure 1:
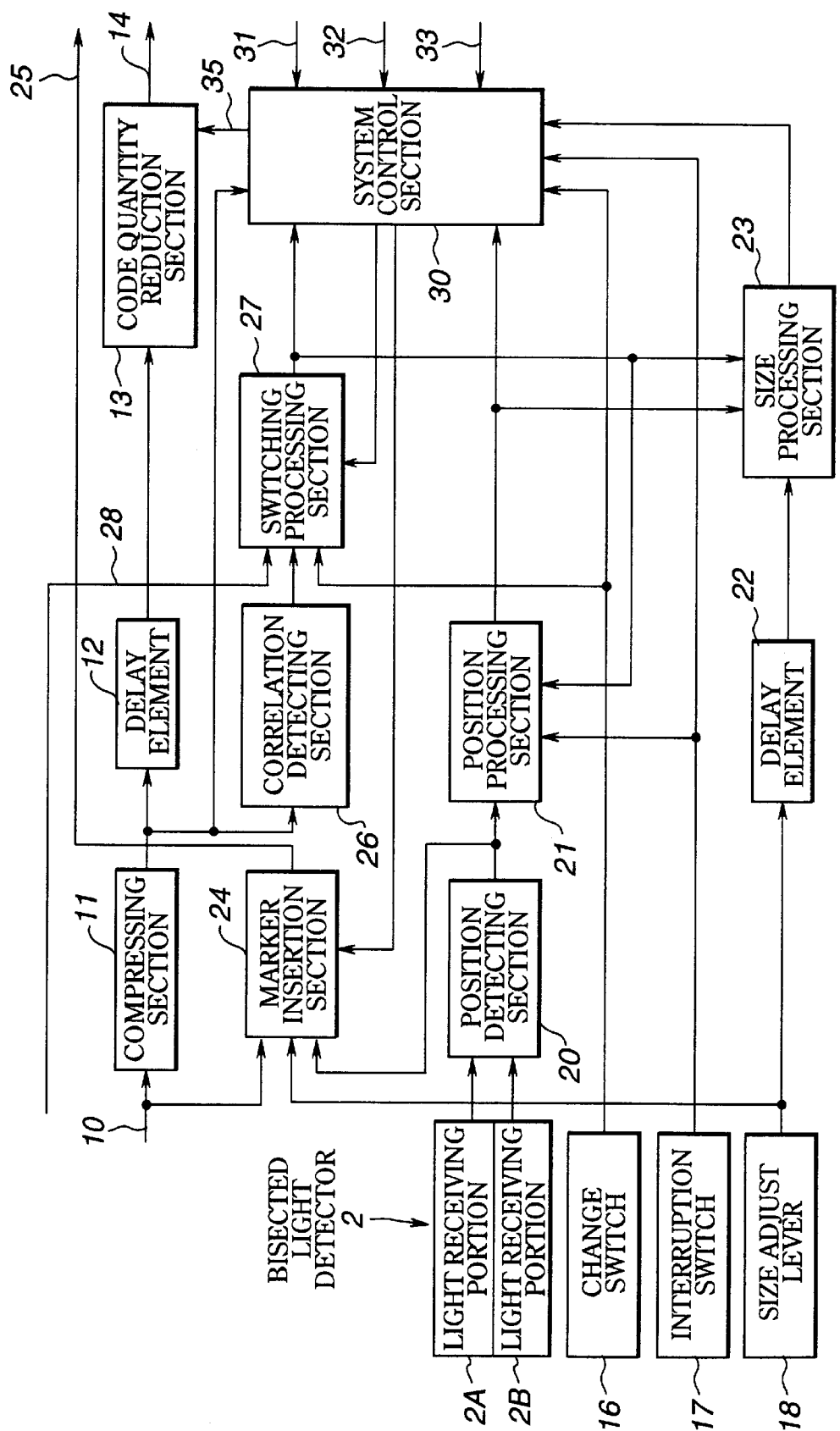
FIG. 1 is a block diagram showing the configuration of a picture compression encoding apparatus according to an embodiment of this invention.

FIG. 1 is a block diagram showing the configuration of the picture compression encoding apparatus according to this embodiment. This picture compression encoding apparatus comprises a compressing section 11 supplied with a video signal 10 to compression-encode this video signal 10, a delay element 12 for delaying, by a predetermined time, output data of this compressing section 11, and a code quantity reduction section 13 supplied with output data from this delay element 12 to vary allocation of code quantity in dependency upon the area as occasion demands so that code quantity allocated to the area except for the visual point position vicinity area is smaller than code quantity allocated to the visual point position vicinity area to thereby carry out reduction of code quantity to output encoded data 14. The compressing section 11 carries out compression processing of video signals by using Discrete Cosine Transform (hereinafter referred to as DCT) utilizing the spatial correlation and bidirectional predictive encoding utilizing the correlation in point of time as employed in, e.g., MPEG (Moving Picture Experts Group) standard. In this case, the compressing section 11 carries out DCT processing in predetermined pixel block units to quantize coefficients after undergone DCT processing to further allow quantized data to undergo variable length encoding to output encoded data. It is to be noted that there may be employed a configuration such that variable length encoding is carried out at the code quantity reproduction section 13 and the compressing section 11 outputs quantized data.

The picture compression encoding apparatus further comprises a switch 16 for change for allowing operator to designate timing, etc. of change of scene, a switch 17 for interruption, which gives instruction (designation) to interrupt change of allocation of code quantity in dependency upon the area at the code quantity reduction section 13, and a size adjust lever 18 for changing size of the visual point position vicinity area.

The picture compression encoding apparatus further comprises a position detecting section 20 for detecting visual point position of operator on the basis of output signals of the respective light receiving portions 2A, 2B of the bisected light detector 2, a position processing section 21 for carrying out processing for determining central position of the visual point position vicinity area on the basis of position information outputted from this position detecting section 20, a delay element 22 for delaying output signal of the size adjust lever 18 by time corresponding to processing time at the position processing section 21, and a size processing section 23 for carrying out processing to determine size of the visual point position vicinity area on the basis of output signal of this delay element 22.

The picture compression encoding apparatus further comprises a marker insertion section 24 for determining position and size of marker on picture from position information from the position detecting section 20 and output signal of the size adjust lever 18 to superimpose signal for marker display on the video signal 10 to output it as an output video signal 25 for monitor.

The picture compression encoding apparatus further comprises a correlation detecting section 26 supplied with output data of the compressing section 11 to examine correlation between current picture and previous picture, a switching processing section 27 supplied with output data of this correlation detecting section 26, output signal of the change switch 16 and switching signal 28 from switcher (not shown) used for camera switching to determine timing of change of scene, and a system control section 30 for controlling the entirety of the picture compression encoding apparatus.

The system control section 30 is supplied with respective output data of the compressing section 11, the position processing section 21, the size processing section 23 and the switching processing section 27, and respective output signals of the change switch 16 and the interruption switch 17, and is further supplied with switching select signal 31 and visual point correction mode signal 32 inputted through switch, etc. (not shown) and prescribed code quantity data 33 inputted through interface (not shown). In addition, the system control section 30 outputs code quantity reduction control signal 35 to the code quantity reduction section 13, and controls the marker insertion section 24 and the switching processing section 27.

The position processing section 21 is also supplied with output signal of the interruption switch 17 and output data of the switching processing section 27. Moreover, the size processing section 23 is also supplied with respective output data of the position processing section 21 and the switching processing section 27.

The position processing section 21, the size processing section 23, the correlation detecting section 26, the switching processing section 27 and the system control section 30 are constituted by, e.g., microcomputer.

Figure 2:
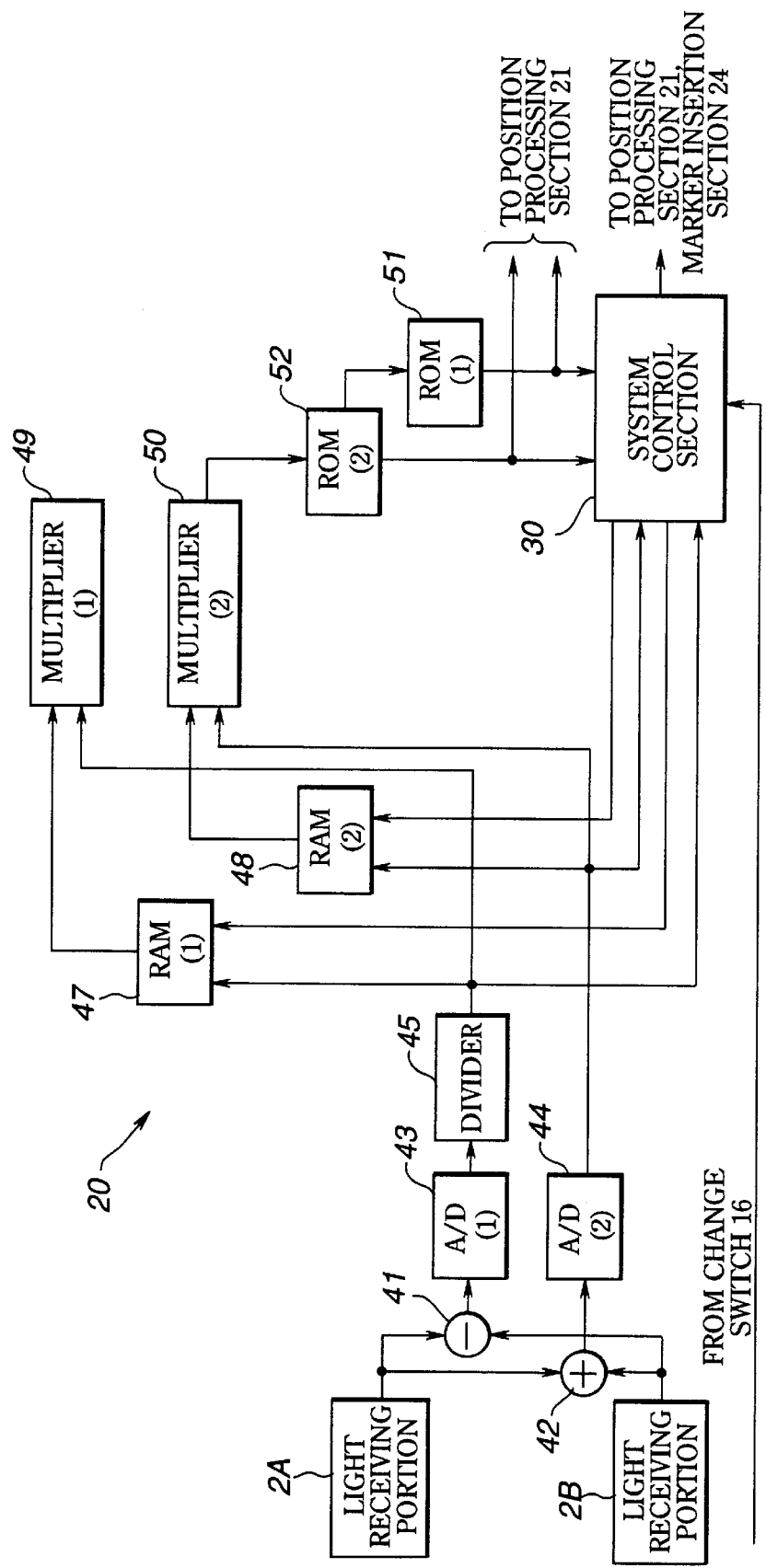
FIG. 2 is a block diagram showing the detailed configuration of position detecting section in FIG. 1.

FIG. 2 is a block diagram showing the detailed configuration of the position detecting section 20 in FIG. 1. This position detecting section 20 comprises a subtracter 41 for generating difference signal between signals after undergone current-voltage conversion of the light receiving portions 2A, 2B at the bisected light detector 2, an adder 42 for generating sum signal of signals after undergone current-voltage conversion of the light receiving sections 2A, 2B, an analog-digital (hereinafter referred to as A/D) converter (1) 43 for converting output signal of the subtracter 41 into, e.g., digital signal of 8 bits, an A/D converter (2) 44 for converting output signal of the adder 42 into, e.g., digital signal of 8 bits, and a divider 45 for dividing output signal of the A/D converter (1) 43 by output signal of the A/D converter (2) 44. Output signal of the divider 45 and output signal of the A/D converter (2) 44 are inputted to the system control section 30. The system control section 30 calculates, at the time of visual point correction, correction value for carrying out conversion into reference values at respective positions indicated by the marker 6 on the basis of output signal of the divider 45, output signal of the A/D converter (2) 44 and position information of the marker 6 (FIG. 5) that the system control section 30 generates to output this correction value in a manner caused to correspond to respective output values of the divider 45 and the AID converter (2) 44.

The position detecting section 20 further comprises a RAM (Random Access Memory) (1) 47 for storing correction value with respect to output signal of the divider 45 outputted from the system control section 30 at the time of visual point correction to output correction value in correspondence with output signal of the divider 45 at the time of encoding of video signal 10, a RAM (2) 48 for storing correction value with respect to output signal of the A/D converter (2) 44 outputted from the system control section 30 at the time of encoding of video signal 10 to output correction value in correspondence with output signal of the A/D converter (2) 44 at the time of encoding of the video signal 10, a multiplier (1) 49 for multiplying, at the time of encoding of video signal 10, output signal of the divider 45 by correction value outputted from the RAM (1) 47, a multiplier (2) 50 for multiplying, at the time of encoding of the video signal 10, output signal of the A/D converter (2) 44 by correction value outputted from the RAM (2) 48, a ROM (Read Only Memory) (1) 51 for converting output signal of the multiplier (1) 49 into position information in the lateral direction on picture, and a ROM (2) 52 for converting output signal of the multiplier (2) 50 into position information in the longitudinal direction on the picture. Output information of the ROMs 51, 52 are inputted to the system control section 30, and are sent to the position processing section 21 in FIG. 1.

The operation of the picture compression encoding apparatus according to this embodiment will now be described. Initially, the operation at the time of visual point correction will be explained. Whether or not the operation of the visual point correction is executed is designated by visual point correction mode signal 32 inputted to the system control section 30. At the time of visual point correction, a control signal to instruct insertion of the marker 6 is sent to the marker insertion section 24 from the system control section 30. The marker insertion section 24 superimposes, in accordance with this control signal, signal for display of marker 6 on the video signal 10 so that marker 6 is inserted at the position prescribed in advance on the picture to output it as output video signal 25 for monitor. When visual point is in correspondence with marker 6 on the picture, operator turns ON the change switch 16. The system control section 30 is operative so that when the change switch 16 is turned ON, it calculates correction value on the basis of respective output signals of the divider 45 and the A/D converter (2) 44 and position information of the marker 6 at that time to allow the RAMs 47, 48 to store this correction value in a manner caused to correspond to respective output values of the divider 45 and the A/D converter (2) 44. When the change switch 16 is turned ON, the system control section 30 successively switches position of the marker 6 by control signal. When the above-mentioned operation is repeated so that measurements at 9 (nine) portions shown in FIG. 5 are successively completed, correction values are all calculated.

The operation at the time of encoding of video signal in the picture compression encoding apparatus according to this embodiment will now be described. This operation is executed except that the operation of visual point correction is designated by the visual point correction mode signal 32. Initially, the operation by operator at the time of encoding of video signal will be described with reference to FIG. 6. At the time of encoding of video signal, the operator 7 who has affixed the holding member 8 to which eyeball movement measurement element is attached operates his own visual point, the change switch 16, the interruption switch 17 and the size adjust lever 18. Namely, the operator 7 changes the visual point while looking at marker 61 appearing on picture 5, and designates, by size adjust lever 18, size of the visual point position vicinity area which is the area where a large code quantity is allocated. As a result, marker 61 for visual point position indicating visual point position is displayed on the picture 5, and frame shaped, e.g., rectangular range designation marker 62 indicating the range of the visual point position vicinity area is displayed at the periphery of the marker 61. When the operator 7 moves the visual point, markers 61, 62 both move on the picture 5 in a manner following the visual point. Moreover, when the operator 7 operates the size adjust lever 18, size of the marker 62 is changed. Examples of display of markers 61, 62 are shown in FIGS. 7A to 7D in connection with four kinds of states where size of the marker 62 is different. Further, when scene of image displayed on the picture 5 is changed (switched), the operator 7 turns ON the change switch 16 to thereby designate timing of change (switching) of scene. In addition, in the case where particularly important portion does not exist on the picture 5, etc., the operator 7 turns ON the interruption switch 17, thereby making it possible to interrupt that a larger code quantity is allocated to the visual point position vicinity area.

At the time of encoding of video signal, signals after undergone current-voltage conversion of the light receiving portions 2A, 2B at the bisected light detector 2 are inputted in succession to the position detecting section 20 shown in FIG. 2. At the position detecting section 20, difference signal and sum signal are generated by the subtracter 41 and the adder 42. The difference signal and the sum signal are respectively converted into digital signals by the A/D converters 43, 44. Moreover, output signal of the A/D converter (1) 43 is divided by output signal of the A/D converter (2) 44 by the divider 45. Output signal of the divider 45 is inputted to the RAM (1) 47 and the multiplier (1) 49, and output signal of the A/D converter (2) 44 is inputted to the RAM (2) 48 and the multiplier (2) 50. The multiplier (1) 49 multiplies output signal of the divider 45 by correction value outputted from the RAM (1) 47 to make correction thereof, and the multiplier (2) 50 multiplies output signal of the A/D converter (2) 44 by correction value outputted from the RAM (2) 48 to make correction thereof. Respective output signals of the multipliers 47, 48 are respectively converted into position information in the lateral direction and in the longitudinal direction on the picture by the ROMs 51, 52, and this position information is sent to the position processing section 21 and the marker insertion section 24.

The marker insertion section 24 determines positions and sizes of markers 61, 62 on the picture from position information from the position detecting section 20 and output signal of the size adjust lever 18 to superimpose signal for marker display on the video signal 10 to output it as monitor output video signal 25. On the basis of this monitor output video signal 25, markers 61, 62 are displayed on picture based on the video signal 10 at the monitor in a superimposed manner. On the other hand, at the position processing section 21, processing for determining central position of the visual point position vicinity area is carried out as described later in detail.

Moreover, output signal of the size adjust lever 18 is delayed, by the delay element 22, by time corresponding to processing time at the position processing section 21, and is inputted to the size processing section 23. At this size processing section 23, processing for determining size of the visual point position vicinity area is carried out. In this example, at the size processing section 23, when the visual point position is fixed, high frequency component of size change is cut on the basis of output data of the position processing section 21. Thus, size change by very small movement of the hand can be suppressed.

The video signal 10 to be encoded is compressed and encoded (compression-encoded) by the compressing section 11, and output data of this compressing section 11 is inputted to the code quantity reduction section 13 in the state delayed by time corresponding to the processing time at the position processing section 21 and the size processing section 23 by the delay element 12.

Moreover, output data of the compressing section 11 is also inputted to the correlation detecting section 26, and correlation between current picture and previous picture is examined by this correlation detecting section 26. In this example, the correlation detecting section 26 takes difference between lower frequency component of coefficients which have been caused to undergo DCT processing at the compressing section 11 of current picture and that of the previous picture to judge that correlation is small when this difference is large (change of the lower frequency component is large). Output data of the correlation detecting section 26 is inputted to the switching processing section 27. The switching processing section 27 is supplied with output signal of the change switch 16 and switching signal 28 from switcher in addition to the above. The switching processing section 27 is operative so that when switching select signal 31 inputted to the system control section 30 takes mode of switch of operator, it determines timing of change of scene on the basis of output data of the correlation detecting section 26 and output signal of the change switch 16. In more practical sense, the switching processing section 27 is operative to assume the time point when the change switch 16 is turned ON as the origin to select, as picture of change of sense, picture in which there is large change of the lower frequency component (correlation is small) of DCT coefficients for time period from −1.0 to 0 sec. as compared to the previous picture. In addition, in the case where change of correlation for the time period from −1.0 to 0 sec. is small, −0.33 sec. is assumed to be change of scene.

Moreover, the switching processing section 27 is operative so that when switching select signal 31 inputted to the system control section 30 takes camera mode, it assumes timing of input of switching signal 28 from switcher used for camera switching as change of scene.

The scene change signal which is output data of the change (switching) processing section 27 indicating change of scene is inputted to the system control section 30, the position processing section 21 and the size processing section 23. As described in detail later, the position processing section 21 is operative so that when visual point positions are intermittently detected by the position detecting section 20 under a predetermined positional relationship, interpolation processing is carried out so that visual point position vicinity areas are continuously set in point of time for time period between detection time points of respective visual point positions. This interpolation processing is carried out in scene units. Further, the position processing section 21 carries out interpolation processing so that visual point position vicinity areas are continuously set in point of time for time period between the detection time point of the first visual point position within one scene and the starting time of scene under a predetermined condition, and carries out interpolation processing so that visual point position vicinity areas are continuously set in point of time for time period between the detection time point of the last visual point position within one scene and the end time of scene under a predetermined condition. The size processing section 23 also carries out interpolation processing similar to the position processing section 21.

The system control section 30 compares code quantity per predetermined time by output data of the compressing section 11 and prescribed value of code quantity prescribed in advance by prescribed code quantity data 33, whereby only in the case where code quantity per predetermined time by output data of the compressing section 11 is above prescribed quantity, it outputs code quantity reduction control signal 35 to the code quantity reduction section 13 to allow the code quantity reduction section 13 to carry out reduction of code quantity so that code quantity per predetermined time outputted from the code quantity reduction section 13 is not above the prescribed value. At this time, the system control section 30 sets visual point position vicinity area on the basis of output data of the position processing section 21 and output data of the size processing section 23 to vary allocation of code quantity in dependency upon the area so that code quantity allocated to the area except for the visual point position vicinity area is smaller than code quantity allocated to the visual point position vicinity area. Reduction of code quantity is carried out by successively decreasing, in order from the higher frequency band side of coefficients after undergone DCT processing, the numbers of bits allocated to those coefficients. In this case, in order to avoid that the boundary portion of the visual point position vicinity area becomes conspicuous, reduction of code quantity is carried out stepwise from the visual point position vicinity area toward the outside. For example, the number of bits allocated is decreased by one 1 bit in succession every pixel block where DCT processing is carried out from the visual point position vicinity area toward the external. In this way, reduction of code quantity is carried out as occasion demands. As a result, encoded data 14 outputted from the code quantity reduction section 13 is outputted to the outside as output data of the picture compression encoding apparatus. This output data is, e.g., transmitted to communication network, or is recorded onto the recording medium.

The position processing at the position processing section 21 will be described in detail with reference to the flowcharts of FIGS. 8 to 19. This position processing is assumed to be, e.g., 500 ms (½ sec.). The processing content of the position processing roughly consists of three kinds of processing of point processing for specifying visual point position in the case where visual point is fixed, vector processing for determining movement vector of visual point position in the case where the visual point is moving, and interruption processing for interrupting that a larger code quantity is allocated to the visual point position vicinity area. Hereinafter, visual point position determined by the point processing is represented by point P (i, p(i)), vector determined by the vector processing is represented by V (i, v(i)), and state of the interruption processing is represented by N (i, n(i)). In this case, i represents time after scene has been changed, and the i-th time means processing for time period of i/2 to (i+1)/2 sec. after the scene has been changed. p(i), v(i), n(i) respectively indicate to what processing current processing corresponds within the same unit time t. Since the interpolation processing is carried out as described later at the time of movement of visual point, plural point processing and vector processing are carried out within the same unit time t. The case of p(i)=0 and v(i)=0 represents actual visual point position where no interpolation processing is carried out. The case of p(i)≠0 and v(i)≠0 represents processing based on the interpolation processing. Moreover, in the case of the interruption processing, even if interpolation processing is implemented, there are instances where the interruption processing is carried out within the same unit time t and there are instances where the interruption processing is not carried out within the same unit time t. However, since whether or not the interruption processing is carried out is determined at the timing when the interruption switch 17 is turned ON as described later, the state where no interruption processing is carried out and the state where the interruption switch 17 is pushed down (is tuned ON) is represented by n(i)=1 and the state where the interruption processing is carried out is represented by n(i)=0.

Figure 8:
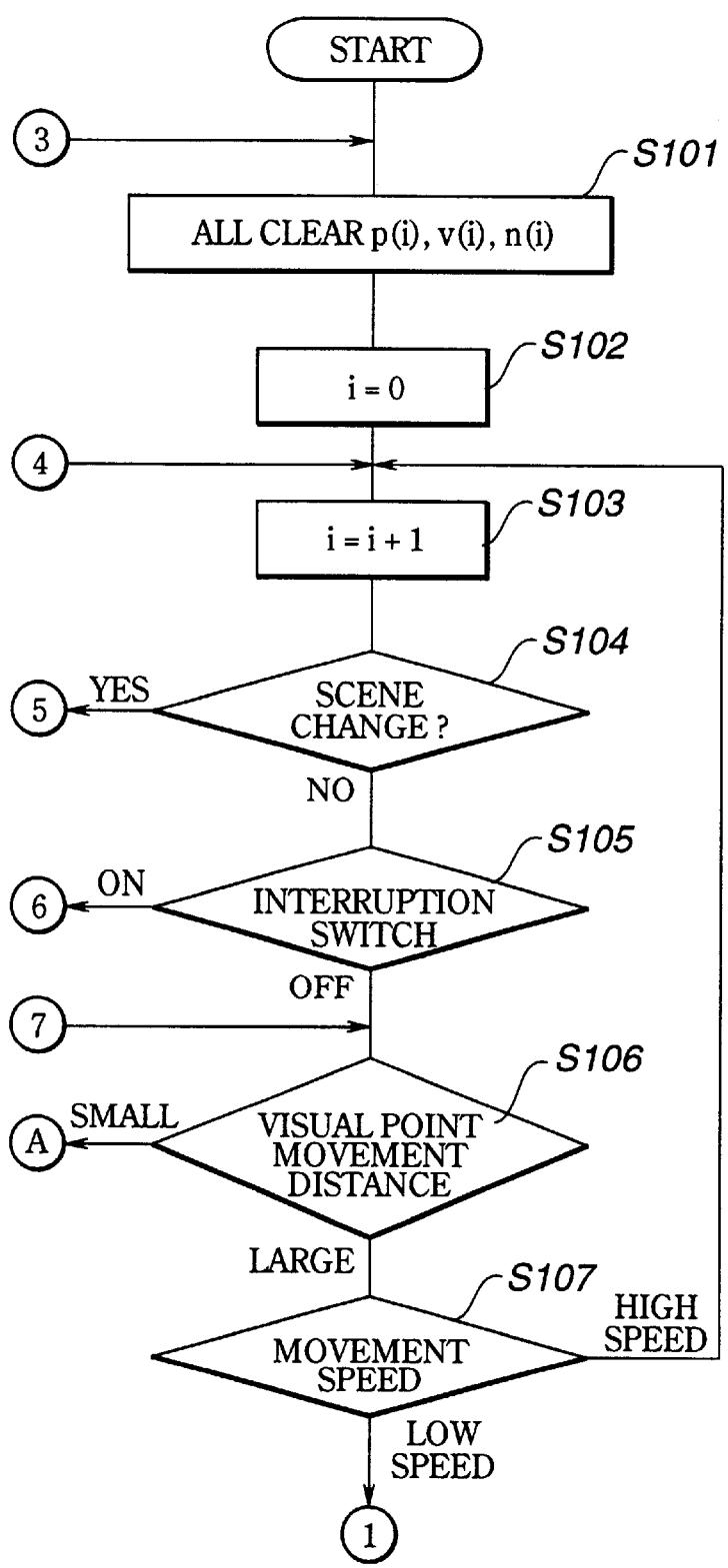
FIG. 8 is a flowchart for explaining the operation of the position processing section in FIG. 1.

As shown in FIG. 8, in the position processing, p(i), v(i) and n(i) are all cleared (are caused to be 0) (step S101). Similarly, i is cleared (is caused to be 0) (step S102). Then, i+1 is caused to be newly i (step S103) to judge whether or not change of scene takes place (step S104). Change information of scene is obtained from change processing section 27. In the case where scene has been changed (Y), the operation processing shifts to end processing (FIGS. 15 to 19) which will be described later. In the case where scene is not changed (N), the state of the interruption switch 17 is confirmed (step S105). In the case where the interruption switch 17 is pushed down (is turned ON), the operation processing shifts to interruption switch processing (FIG. 14) which will be described later. In the case where the interruption switch 17 is not pushed down (is in OFF state), whether or not the visual point movement distance is small or large is judged (step S106). In this case, it is assumed that visual point movement distance within unit time t is determined, whereby in the case where this visual point movement distance is within 20×20 in terms of pixels on the picture, it is judged that the visual point movement distance is small, and in the case except for the above, it is judged that the visual point movement distance is large. In the case where the visual point movement distance is small, the visual point is assumed to be fixed to shift to point processing (FIG. 9) which will be described later. In the case where the visual point movement distance is large, whether movement velocity of the visual point is high or low is judged (step S107). In this case, such an approach is employed to judge movement velocity of the visual point on the basis of movement distance between frames (1/30 sec.). In the case where the visual point is moved in the longitudinal direction or in the lateral direction by 100 pixels or more between frames within the unit time t, it is assumed to be judged that movement velocity of the visual point is high. In the case except for the above, it is assumed to be judged that movement velocity of the visual point is low. In the case where movement velocity of the visual point is high, it is assumed that the visual point is moving to return to the step S103 without carrying out processing within unit time t to update i. It is to be noted that since such high speed moving body moving in the longitudinal direction or in the lateral direction by 100 pixels or more between frames cannot be followed by the eye of the human being on the picture, there is no necessity of carrying out processing to allocate a larger code quantity to the visual point position vicinity area. In the case where movement velocity of the visual point is low, the operation processing shifts to vector processing (FIGS. 11, 12) which will be described later.

Figure 9:
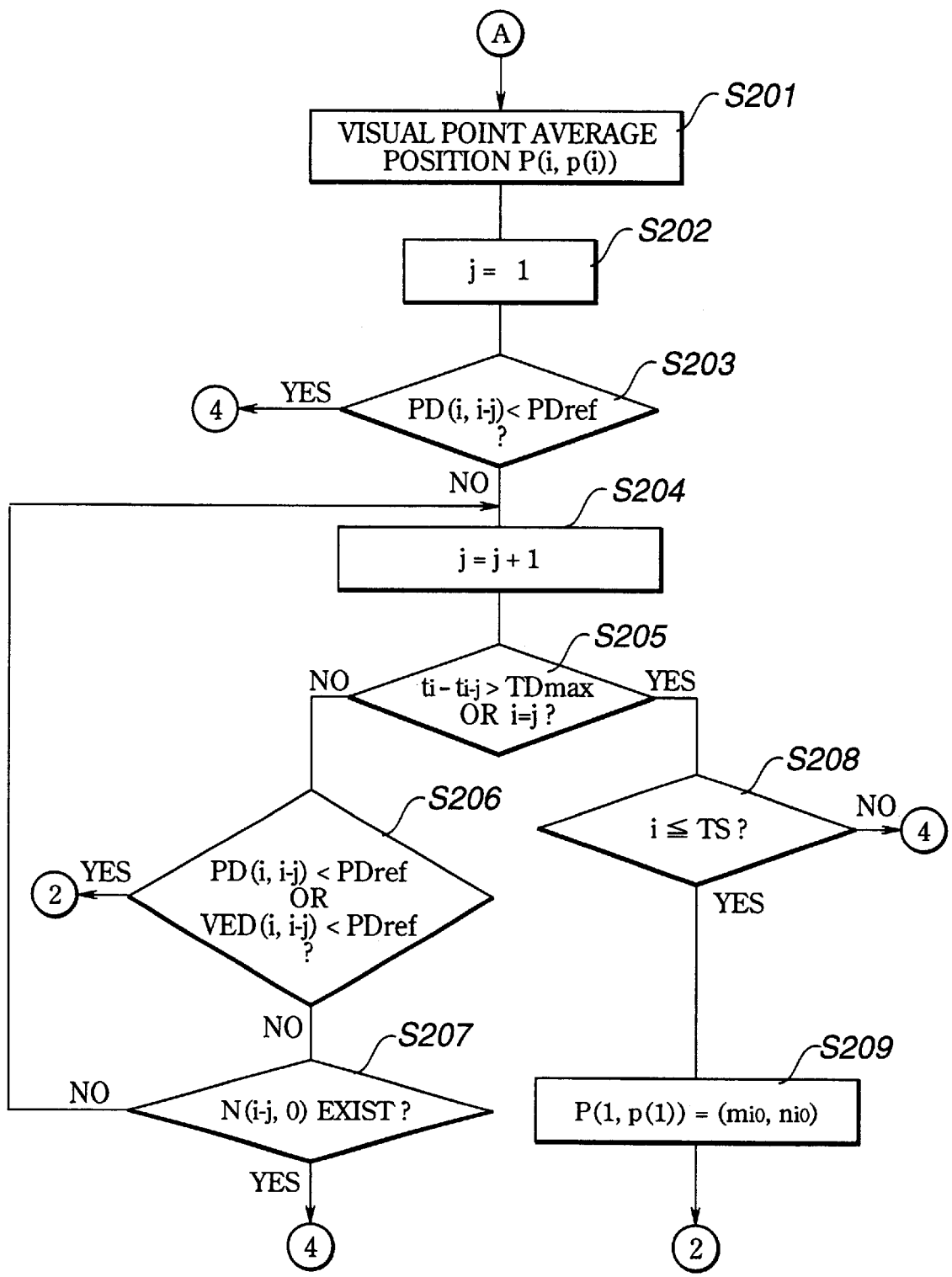
FIG. 9 is a flowchart for explaining the operation of the position processing section in FIG. 1.

In the point processing shown in FIG. 9, such an approach is employed to first determine average value of visual point positions (visual point average position) within unit time t to assume this average value as point $P(i, p(i))=(m_{i0}, n_{i0})$ determined by processing within the unit time t (step S201). In this case, the visual point average position is determined by averaging visual point positions every frame, for example. Moreover, $m_{i0}$ is assumed to be position in the lateral direction on the picture and $n_{i0}$ is assumed to be position in the longitudinal direction on the picture. Then, whether or not interpolation processing is carried out is judged. Since the interpolation processing is unnecessary when the portion in the vicinity of the same point is continuously viewed, whether or not the interpolation processing is carried out is judged on the basis of distance between current point and point determined by the processing at the unit time t earlier by one. As distance between points, there is used value PD (x, y) obtained by adding square of difference between respective positions in the lateral and longitudinal directions. In this case, x, y represent i at the time of determination of respective points. PD (x, y) is represented by the following formula.

$$PD(x,y)=(m_{x0}-m_{y0})^2+(n_{x0}-n_{y0})^2$$

In more practical sense, initially, variable j is set to 1 (step S202). Then, whether or not PD(i, i–j) is smaller than fixed distance $PD_{ref}$ is judged (step S203). In this case, $PD_{ref}$ is set to 1800. In the case where PD (i, i–j) is smaller than $PD_{ref}$ (Y), it is assumed that the portion in the vicinity of the same point is continuously viewed to return to the step S103 (FIG. 8) without carrying out interpolation processing to update i for the purpose of shifting to the processing at the next unit time t. On the other hand, in the case where PD(i, i–j) is $PD_{ref}$ or more (N), whether or not the portion previously viewed exists in the vicinity of the point at the time of current processing is judged. This is carried out by judging whether or not there exists point determined by the previous point processing or end point position of vector determined by the previous vector processing within predetermined time $TD_{max}$ (assumed to be 5 sec. in this case). In this case, in the vector processing, vector V(i, v(i)) is represented by initial point and end point, and when v(i)=0 which is not the interpolation processing, vector V(i, v(i)) is represented by the following formula. In this formula, position of the initial point is assumed to be $(ms_{i0}, ns_{i0})$ and position of the end point is assumed to be $(me_{i0}, ne_{i0})$.

$$V(i,v(i))=(ms_{i0}, ns_{i0}, me_{i0}, ne_{i0})$$

The judgment as to whether or not there exists the portion previously viewed in the vicinity of point at the time of current processing is carried out as follows in more practical sense. Namely, initially, j+1 is newly set to j (step S204) to judge whether $t_i-t_{i-1}$ is above $TD_{max}$ or i=j, or corresponds to the case except for the above is judged (step S205). In the case except for the above, i.e., in the case where $t_i-t_{i-1}$ is within $TD_{max}$ and i=j does not hold (N), whether PD(i, i–j) is smaller than fixed distance $PD_{ref}$, or distance VED(i, i–j) between point at the time of current processing and end point of vector determined by the previous vector processing is smaller than fixed distance $PD_{ref}$, or corresponds to the case except for the above is judged (step S206). In this case, VED(x, y) is represented by the following formula.

$$VED(x,y)=(m_{x0}-me_{y0})^2+(n_{x0}-ne_{y0})^2$$

In the case where PD(i, i–j) is smaller than $PD_{ref}$, or VED(i, i–j) is smaller than $PD_{ref}$ (step S206; Y), interpolation processing of point (FIG. 10) is carried out. In the case except for the case where PD(i, i–j) is smaller than $PD_{ref}$, or VED(i, i–j) is smaller than $PD_{ref}$ (step S206; N), whether or not N(i–j, 0) exists is judged (step S207). If N(i–j, 0) exists (Y), it is considered that the interruption processing is carried out. Accordingly, this processing is separated from the previous portion. Namely, the operation processing returns to the step S103 (FIG. 8) without carrying out the interpolation processing to update i for the purpose of shifting to the processing at the next unit time t. If N(i–j, 0) does not exist (N), the operation processing returns to the step S204.

In the case where the portion viewed previously exists in the vicinity of point at the time of current processing as stated above, the interpolation processing is carried out. As a result, visual point position vicinity areas are set continuously in point of time in the vicinity of point at the time of current processing. As occasion demands, such a processing to allocate a larger code quantity to the visual point position vicinity area is carried out. Thus, in the case where, e.g., operator carefully observes in a repeated manner, while changing the visual point, in succession, plural portions within the picture, visual point position vicinity areas are set continuously in point of time respectively in the vicinity of carefully observed plural portions.

In the case where the portion previously viewed cannot be found out in the vicinity of point at the time of current processing within fixed time $TD_{max}$ or for a time period until the starting time of scene (step S205; Y), whether or not the time i after scene has been changed is within the prescribed time TS is judged (step S208). In the case where the time i after scene has been changed is above the prescribed time TS (N), the operation processing returns to the step S103 (FIG. 8) without carrying out the interpolation processing to update i for the purpose of shifting to processing at the next unit time t. In the case where the time i after scene has been changed is within the prescribed time TS (step S208; Y), position of point P (1, p(1)) at i=1 is caused to be the same as position $(m_{i0}, n_{i0})$ of point at the time of current processing (step S209) for the purpose of carrying out processing to shift to the interpolation processing (FIG. 10) of point to carry out interpolation processing of point for a time period from the starting time of scene to the time of current processing.

Figure 10:
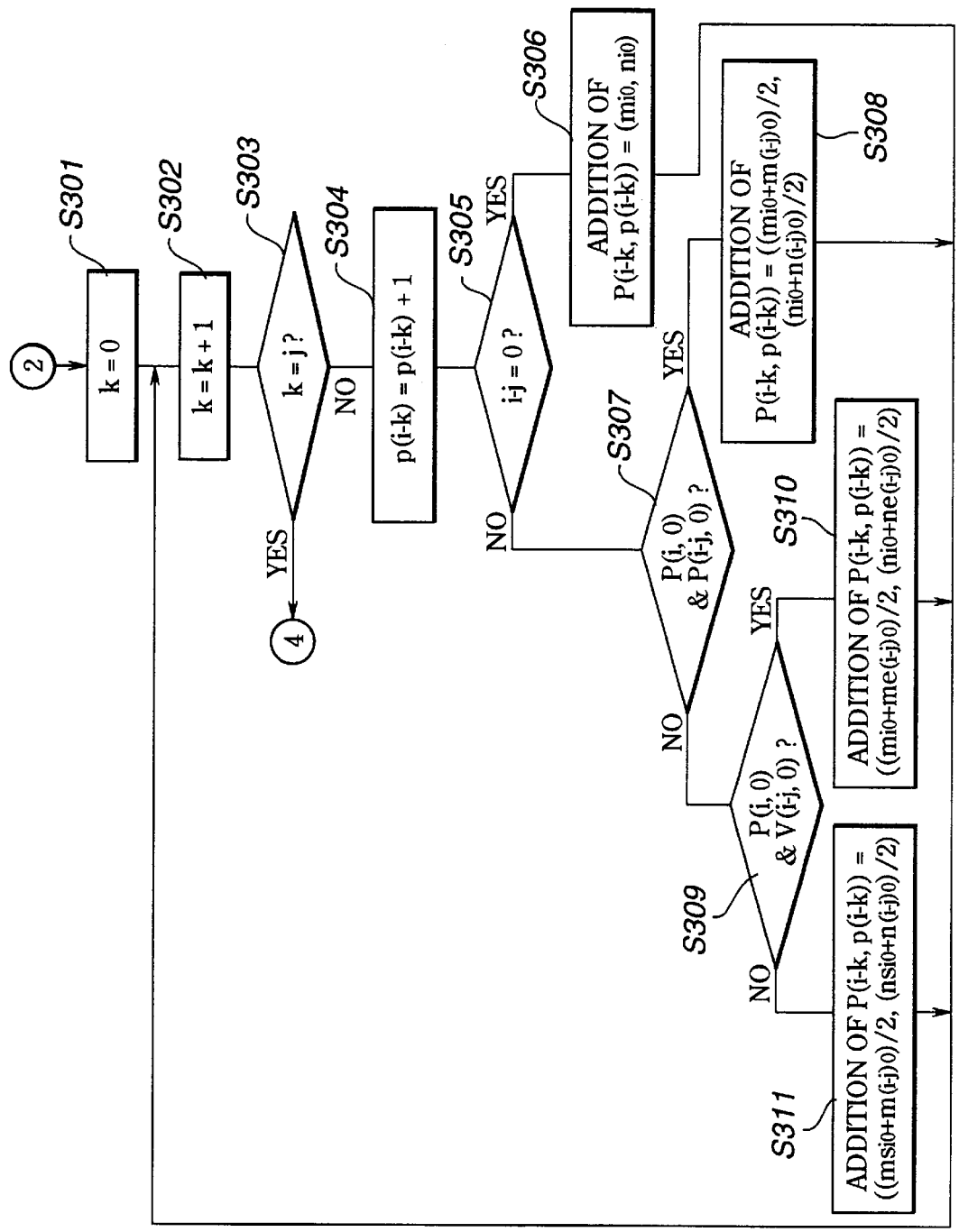
FIG. 10 is a flowchart for explaining the operation of the position processing section in FIG. 1.

FIG. 10 shows the interpolation processing of point. In this interpolation processing of point, variable k is initially set to 0 (step S301) thereafter to allow k+1 to be newly k (step S302) thereafter to judge whether or not k=j holds (step S303). In the case where k=j does not hold (N), p(i–k)+1 is caused to be newly p(i–k) (step S304). Namely, the number of processing operations is incremented by 1. Then, whether or not i–j=0 is judged (step S305). In the case of i–j=0 (Y), points at the time of current processing are filled for a time period from the starting time of scene up to current processing time. Namely, interpolation value P(i−k, p(i−k)) of point is caused to be the same as position ($m_{i0}$, $n_{i0}$) of point at the time of current processing to add this interpolation value (step S306) to shift to step S302. In the case where i−j=0 does not hold (step S305; N), whether or not P(i, 0) and P(i−j, 0) exist is judged (step S307). In the case where P(i, 0) and P(i−j, 0) exist (Y), i.e., in the case where interpolation processing is carried out between point at the time of current processing and point at the previous time processing of (i−j), since two points have very close positional relationship, interpolation value P (i−k, p(i−k)) of point is caused to be center value between two points (($m_{i0}+m_{(i−j)0}$)/2, ($n_{i0}+n_{(i−j)0}$/2) to add this interpolation value (step S308) to return to the step S302. In the case except for the case where P(i, 0) and P(i−j, 0) exist (step S307; N), whether or not P(i, 0) and V(i−j, 0) exist is judged (step S309). In the case where P(i, 0) and V(i−j, 0) exist (Y), i. e., in the case where interpolation processing is carried out between point at the time of current processing and end point of vector at the time of previous processing of (i−j), since two points have very close positional relationship, interpolation value P of point (i−k, p(i−k)) is caused to be center value between two points (($m_{i0}+me_{(i−j)0}$)/2, ($n_{i0}+ne_{(i−j)0}$)/2) to add this interpolation value (step S310) to return to the step S302. In the case except for the case where P(i, 0) and V(i−j, 0) exist (step S309; N), there results (is carried out) interpolation processing between initial point of vector at the time of current processing and point at the previous time of processing of (i−j). Also in this case, since two points have very close positional relationship, interpolation value P of point (i−k, p(i−k)) is caused to be center value between two points (($ms_{i0}+m_{(i−j)0}$)/2, ($ns_{i0}+n_{(i−j)0}$)/2) to add this interpolation value (step S311) to return to the step S302. When there results k=j (step S303; Y), the interpolation processing of point is completed to return to the step S103 (FIG. 8).

Figure 11:
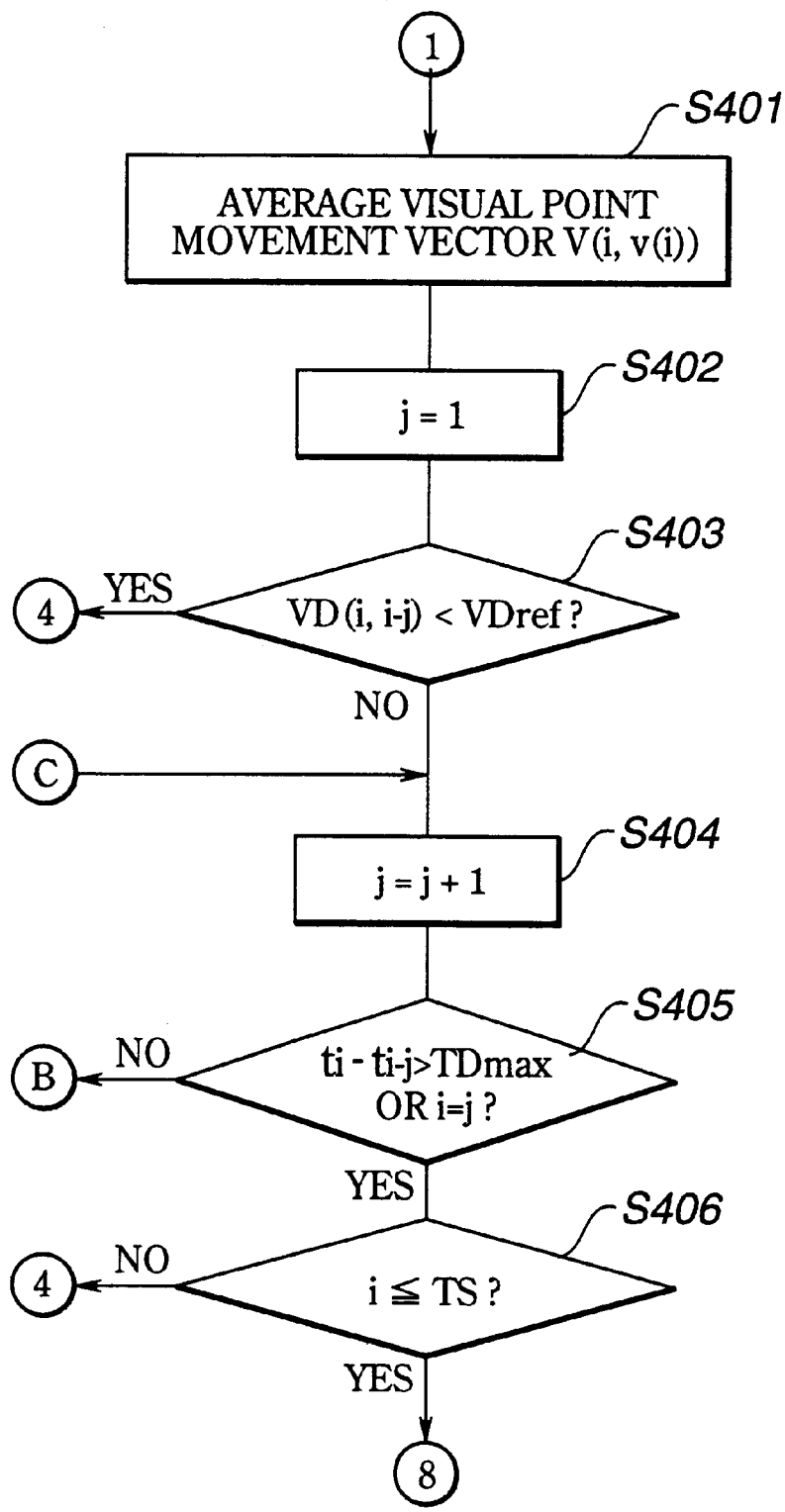
FIG. 11 is a flowchart for explaining the operation of the position processing section in FIG. 1.
Figure 12:
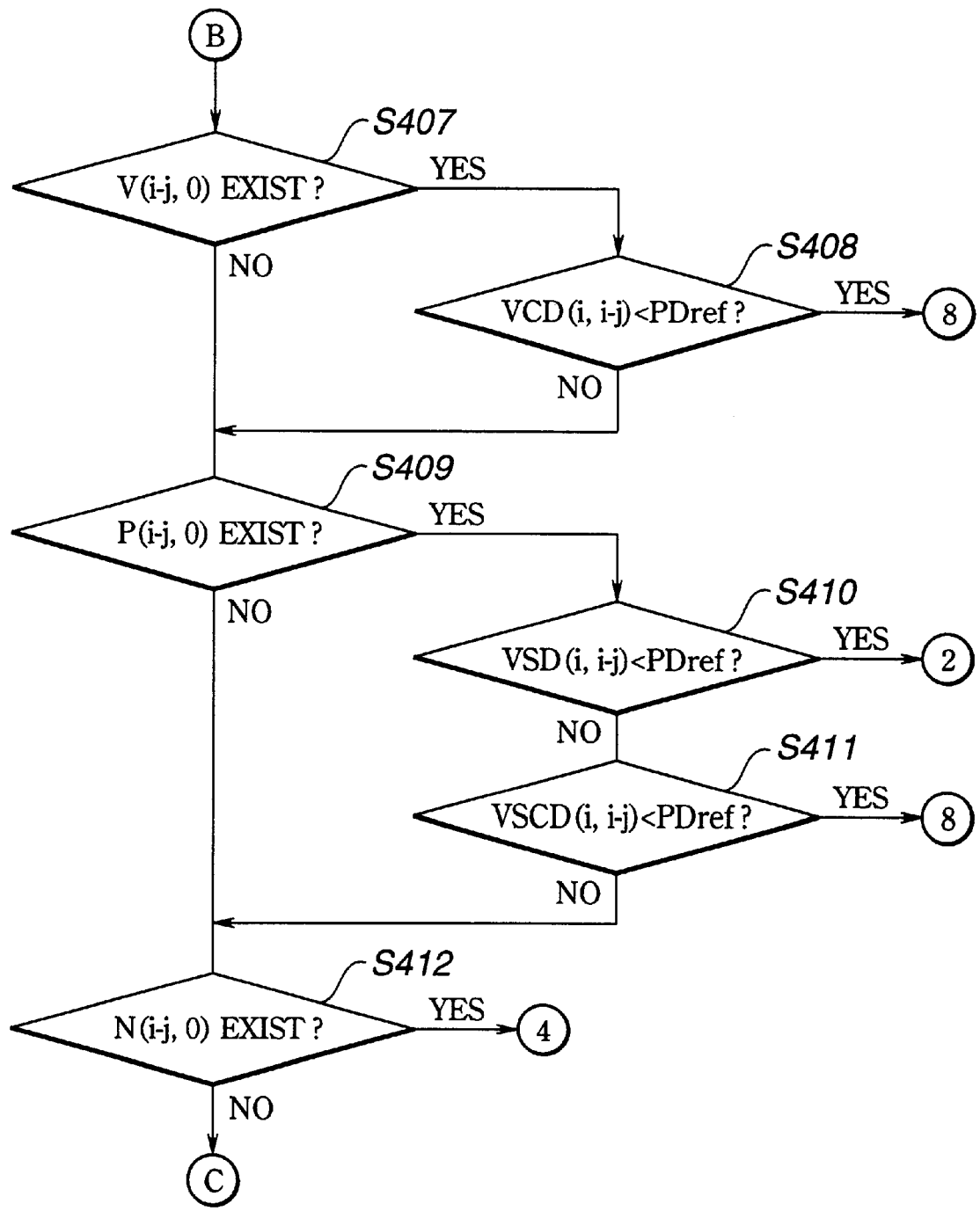
FIG. 12 is a flowchart for explaining the operation of the position processing section in FIG. 1.

FIGS. 11 and 12 show vector processing. An average value of visual point position vectors within unit time t (average visual point movement vector) is first determined to allow this average value to be vector V(i, v(i)) determined by processing within the unit time t (step S401). The average visual point movement vector is determined, e.g., by determining average value of vectors of visual point movement between respective frames within the unit time t to multiply this average vector by 15 times with the center of the average vector being as reference. Then, similarly to the case of the point processing, whether or not the interpolation processing is carried out is judged. Namely, since the interpolation processing is unnecessary when the visual point is continuously moving while seeking for the same object, there is judged whether or not the interpolation processing is carried out on the basis of distance between initial point of vector at the time of current processing and end point of vector determined by processing earlier by one. As distance between initial point of vector at the time of current processing and end point of vector determined by processing earlier by one, there is used value VD(x, y) obtained by adding square of differences between respective positions in the lateral direction and in the longitudinal direction. In this case, x, y represent i at the time of determination of respective vectors. VD(x, y) is represented by the following formula.

$$VD(x,y)=(ms_{x0}-me_{y0})^2+(ns_{x0}-ne_{y0})^2$$

In more practical sense, initially, variable j is set to 1 (step S402). Then, whether or not VD(i, i−j) is smaller than predetermined distance $VD_{ref}$ is judged (step S403). In this case, similarly to $PD_{ref}$, $VD_{ref}$ is set to 1800. In the case where VD(i, i−j) is smaller than $VD_{ref}$ (Y), the vector is assumed to be continuous to return to the step 103 (FIG. 8) without carrying out the interpolation processing to update i for the purpose of shifting to the processing at the next unit time t. On the other hand, in the case where VD(i, i−j) is $VD_{ref}$ or more (N), j+1 is caused to be newly j (step S404) to judge whether $t_i-t_{i-j}$ is above $TD_{max}$ or i=j, or corresponds to the case except for the above (step S405). In the case except for the above, i.e., in the case where $t_i-t_{i-j}$ is within $TD_{max}$ and i=j does not hold (N), there is judged continuity of vector at the time of current processing and vector determined by previous vector processing or point determined by the previous point processing.

In more practical sense, initially, as shown in FIG. 12, whether V(i−j, 0) exists is judged (step S407). In the case where V(i−j, 0) exists (Y), continuity of vector at the time of current processing and vector determined by the previous vector processing is judged. In the case of the vector processing, continuity of vector is judged by difference between initial point of vector at the time of current processing predicted from previous vector and initial point of actual vector at the time of current processing, or difference between initial point of the previous vector predicted from vector at the time of current processing and initial point of previous actual vector. In this case, continuity of vector is assumed to be judged by difference between initial point of the previous vector predicted from vector at the time of current processing and initial point of the previous actual vector. In this case, initial points of previous vectors predicted from vector at the time of current processing (hereinafter referred to as vector initial point predictive value) $mc_{ij}$, $nc_{ij}$ can be determined by shifting (in point of time) vector at the time of current processing by time difference as it is, and are expressed by the following formulas.

$$mc_{xy}=ms_{x0}-(x-y)\times(me_{x0}-ms_{x0})$$

$$nc_{xy}=ns_{x0}-(x-y)\times(ne_{x0}-ns_{x0})$$

VCD(x, y) representing distance between vector initial point predictive values $mc_{xy}$, $nc_{xy}$ and initial point of the previous actual vector is represented by the following formula.

$$VCD(x,y)=(mc_{xy}-ms_{y0})^2-(nc_{xy}-ns_{y0})^2$$

Accordingly, in the case where V(i−j, 0) exists (step S407; Y), whether or not VCD(i, i−j) is smaller than $PD_{ref}$ is judged (step S408). In the case where VCD(i, i−j) is smaller than $PD_{ref}$ (Y), interpolation processing of vector (FIG. 13) is carried out. In the case where V(i−j, 0) does not exist (step S407; N) or VCD(i, i−j) is $PD_{ref}$ or more (step S408; N), whether or not P(i−j, 0) exists is judged (step S409). In the case where P(i−j, 0) exists (Y), continuity of vector at the time of current processing and point determined by the previous point processing is judged.

In this case, distance VSD(x, y) between initial point of vector at the time of current processing and the previous point and VSCD(x, y) representing distance between vector initial point predictive values $mc_{xy}$, $nc_{xy}$ and the previous point are defined by the following formulas.

$$VSD(x,y)=(ms_{x0}-m_{y0})^2+(ns_{x0}-n_{y0})^2$$

$$VSCD(x,y)=(mc_{xy}-m_{y0})^2+(nc_{xy}-n_{y0})^2$$

In the case where P(i−j, 0) exist (step S409; Y), whether or not VSD (i, i−j) is smaller than $PD_{ref}$ is initially judged (step S410). In the case where VSD(i, i–j) is smaller than $PD_{ref}$ (Y), interpolation processing of point (FIG. 10) is carried out. In the case where VSD(i, i–j) is $PD_{ref}$ or more (N), whether or not VSCD(i, i–j) is smaller than $PD_{ref}$ is judged (step S411). In the case where VSCD(i, i–j) is smaller than $PD_{ref}$ (Y), interpolation processing of vector (FIG. 13) is carried out.

In the case where P(i–j, 0) does not exist (step S409; N) or in the case where VSCD(i, i–j) is $PD_{ref}$ or more (step S411; N), whether or not N(i–j, 0) exists is judged (step S412). If N(i–j, 0) exists (Y), since the interruption processing is assumed to be carried out, current processing is separated from the portion earlier than that. Namely, the operation processing returns to the step S103 (FIG. 8) without carrying out the interpolation processing to update i for the purpose of shifting to the processing at the next unit time t. If N(i–j, 0) does not exist (N), the operation processing returns to the step S404 (FIG. 11).

In the case where there is continuity between vector at the time of current processing and vector determined by the previous vector processing or point determined by the previous point processing, the interpolation processing is carried out so that visual point position vicinity areas are set continuously in point of time. Thus, in the case where, e.g., operator alternately carefully observes object moving within picture on screen and other object (either fixed object or moving object may be employed), visual point position vicinity areas are set continuously in point of time respectively with respect to plural objects which have been carefully observed.

In the case where interpolation processing is not carried out similarly to the point processing (step S405; Y), whether or not time i after the scene has been changed is within the prescribed time TS is judged (step S406 of FIG. 11). In the case where the time i after the scene has been changed is above the prescribed time TS (N), the operation processing returns to the step S103 (FIG. 8) without carrying out interpolation processing to update i for the purpose of shifting to processing at the next unit time t. In the case where the time i after the scene has been changed is within the prescribed time TS (step S406; Y), the operation processing shifts to the interpolation processing of vector (FIG. 13) to carry out interpolation processing of vector for a time period from the starting time of scene to the current processing time.

Figure 13:
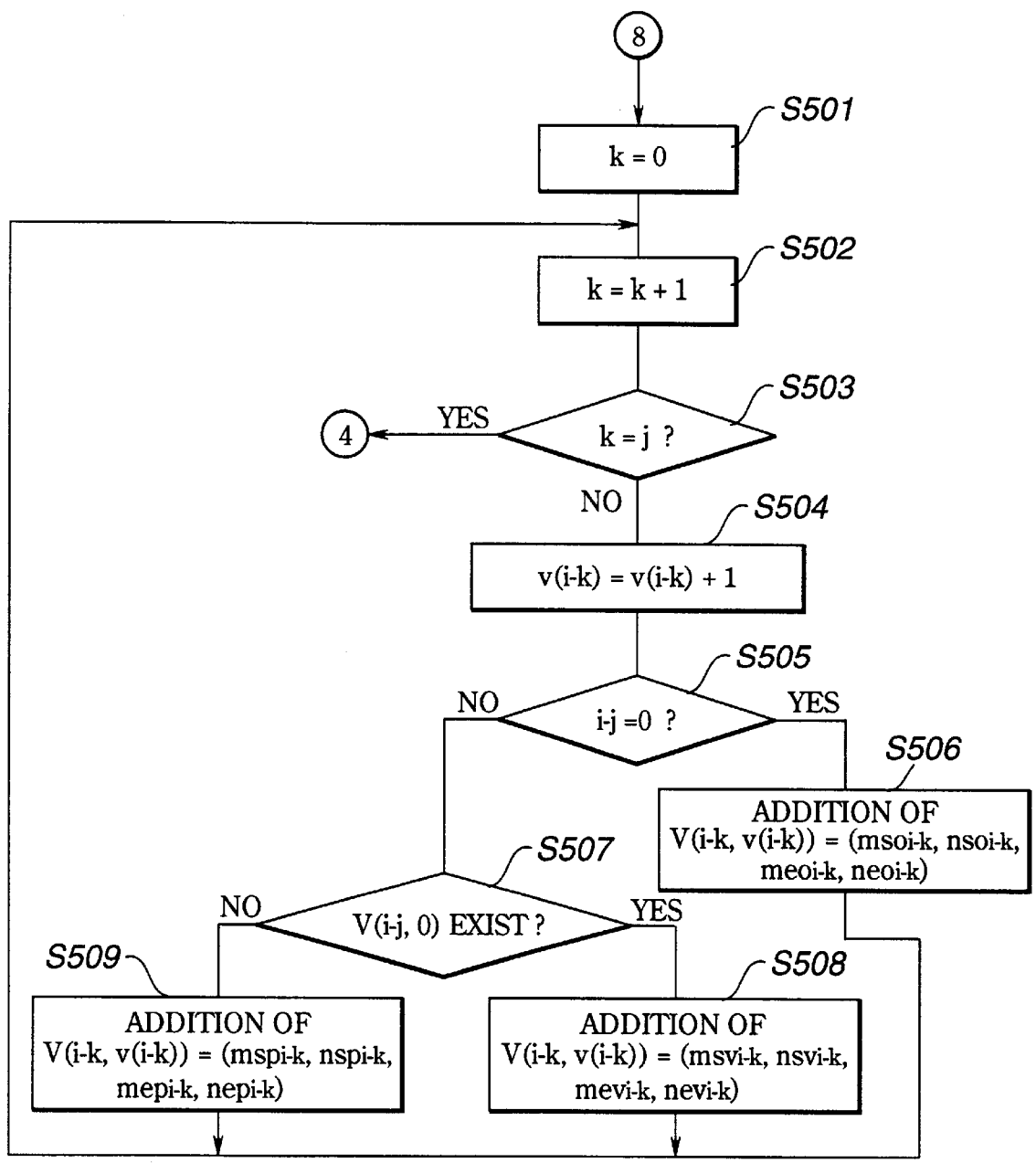
FIG. 13 is a flowchart for explaining the operation of the position processing section in FIG. 1.

FIG. 13 shows interpolation processing of vector. In the interpolation processing of vector, variable k is initially set to 0 (step S501) thereafter to allow k+1 to be newly k (step S502) thereafter to judge whether or not k=j holds (step S503). In the case where k=j dose not hold (N), v(i–k)+1 is caused to be newly v(i–k) (step S504). Namely, the number of processing operations is incremented by 1. Then, whether or not i–j=0 holds is judged (step S505). In the case of i–j=0 (Y), interpolation values of vectors are added for a time period from the starting time of scene up to the current processing time to fill vectors arriving at the visual point at the current processing time (step S506) to return to the step S502. Interpolation value of vector is value obtained by extending vector at the current processing time. Thus, it is sufficient to replace initial points of respective certain vectors by end point of vector earlier by one in order retroactively in point of time to prepare end points of respective vectors earlier by one, and to shift retroactively time by difference between end point and initial point of vector at the current processing time from the prepared end point to prepare initial points of respective vectors earlier by one. Interpolation value of vector V(i–k, v(i–k)) is represented by the following formula in more practical sense.

$$V(i-k, v(i-k)) = (ms0_{i-k}, ns0_{i-k}, me0_{i-k}, me0_{1-k})$$

In the above formula, $$ms0_{i-k} = ms_{i-k+1\ v(i-k+1)} - (ms_{i0} - me_{i0})$$

$$ns0_{i-k} = ns_{i-k+1\ v(i-k+1)} - (ns_{i0} - ne_{i0})$$

$$me0_{i-k} = ms_{i-k+1\ v(i-k+1)}$$

$$ne0_{i-k} = ns_{i-k+1\ v(i-k+1)}$$

In the case where i–j=0 does not hold (step S505; N), whether or not V(i–j, 0) exists is judged (step S507). In the case where V(1–j, 0) exists (Y), i.e., in the case where interpolation processing is carried out between vector at the current processing time and vector at the previous processing time of (i–j), initial points of respective vectors at the current processing time and end points of respective previous vectors are connected to divide them every unit time required for passing through the distances therebetween to determine interpolation values of respective vectors to add interpolation values of vectors (step S508) to return to the step S502. Interpolation value V of vector (i–k, v(i–k)) is represented by the following formula in more practical sense.

$$V(i-k, v(i-k)) = (msv_{i-k}, nsv_{i-k}, mev_{i-k}, nev_{i-k})$$

In the above mentioned formula, $$msv_{i-k} = ms_{i-k+1\ v(i-k+1)} - (ms_{i0} - me_{i-j0})/(j-1)$$

$$nsv_{i-k} = ns_{i-k+1\ v(i-k+1)} - (ns_{i0} - ne_{i-j0})/(j-1)$$

$$mev_{i-k} = ms_{i-k+1\ v(i-k+1)}$$

$$nev_{i-k} = ns_{i-k+1\ v(i-k+1)}$$

In the case where V–(i–j, 0) does not exist (step S507; N), i.e., in the case where interpolation processing is carried out between vector at the current processing time and point at the previous processing time of (i–j), initial points of respective vectors at the current processing time and previous points are connected to divide distances therebetween every unit time required for passing through the distances to determine interpolation values of respective vectors to add interpolation values of vectors (step S509) to return to the step S502. Interpolation value V(i–k, v(i–k)) of vector is represented by the following formula in more practical sense.

$$V(i-k, v(i-k)) = (msp_{i-k}, nsp_{i-k}, mep_{i-k}, nep_{i-k})$$

In the above mentioned formula, $$msp_{i-k} = ms_{i-k+1\ v(i-k+1)} - (ms_{i0} - m_{i-j0})/(j-1)$$

$$nsp_{i-k} = ns_{i-k+1\ v(i-k+1)} - (ns_{i0} - n_{i-j0})/(j-1)$$

$$mep_{i-k} = ms_{i-k+1\ v(i-k+1)}$$

$$nep_{i-k} = ns_{i-k+1\ v(i-k+1)}$$

If k=j holds (step S503; Y), interpolation processing of vector is completed to return to the step S103 (FIG. 8).

Figure 14:
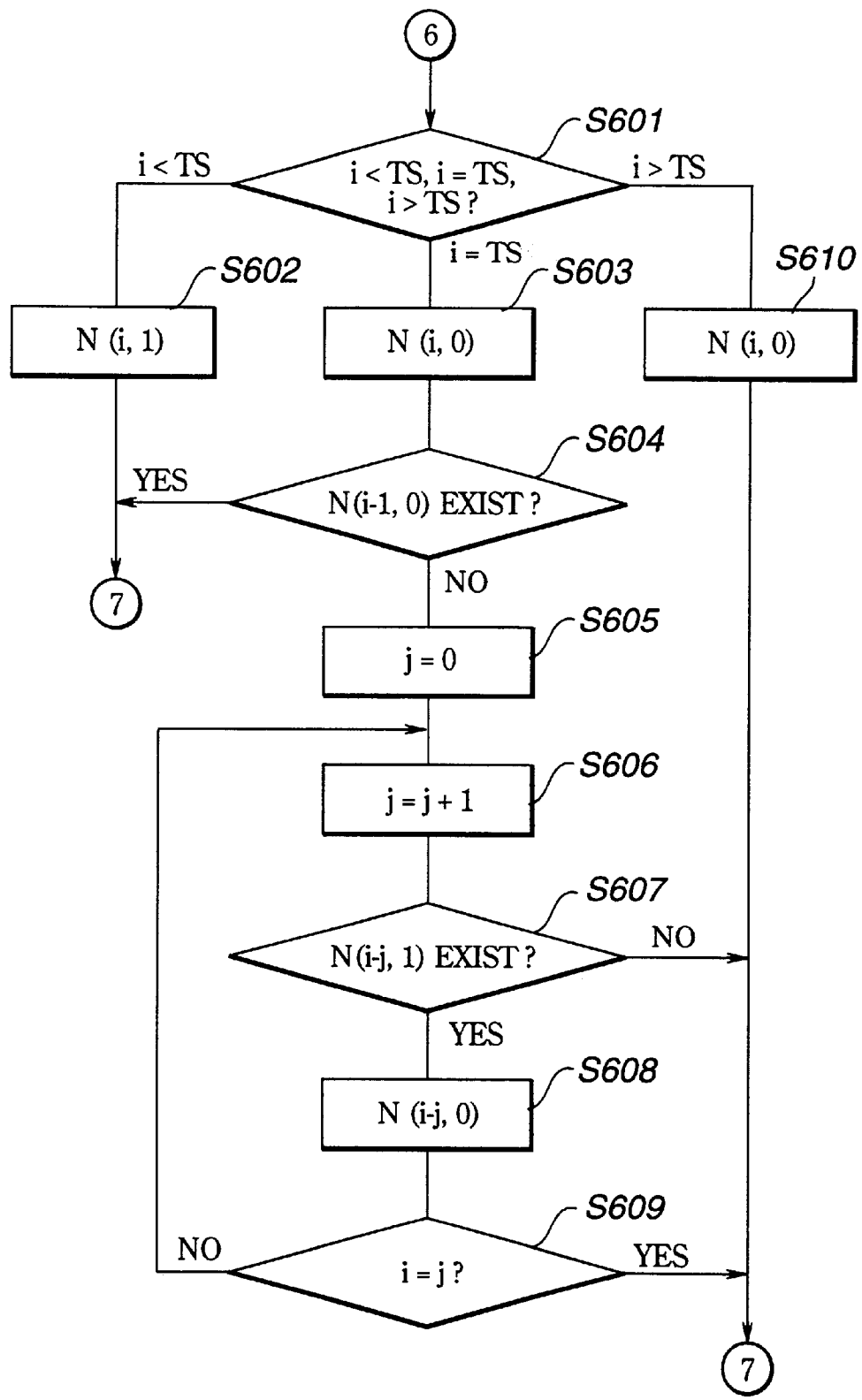
FIG. 14 is a flowchart for explaining the operation of the position processing section in FIG. 1.

FIG. 14 shows interruption switch processing. In this interruption switch processing, interpolation processing of the interruption processing is carried out. As this interpolation processing, there are two kinds of processing of processing which considers the interruption switch 17 to be in OFF state after scene change in the case where the interruption switch 17 is turned OFF state within a predetermined time after scene change when ON state of the interruption switch 17 is continued from the time of scene change and processing which considers the interruption switch 17 to be in ON state from the scene change time in the case where the interruption switch 17 is turned ON within a predetermined time after scene change when OFF state of the interruption switch 17 is continued from the scene change. In the interruption switch processing, the time i from the time when the scene has been changed and the prescribed time TS are initially compared (step S601). When i is smaller than the prescribed time TS, n(i) is set to 1, i.e., N(i, 1) is set (step S602) to return to the step S106 (FIG. 8). It is to be noted that when the interruption switch 17 is not pushed down and the interpolation processing is not carried out, the interruption processing is not carried out while maintaining n(i)=1. In the case where the interruption switch 17 is turned OFF within the prescribed time TS after scene change when ON state of the interruption switch 17 is continued from the scene change time by the processing of step S602, the interruption switch 17 is assumed to be in OFF state after scene change. Thus, the interruption processing is not carried out from the time when scene change has been conducted.

When i is equal to the prescribed time TS at step S601, n(i) is set to 0, i.e., N(i, 0) is set (step S603) to carry out the interruption processing to shift to interpolation processing. In this interpolation processing, the state of interruption processing at the previous processing time is initially confirmed to judge whether or not n(i−1) is equal to 0, i.e., N(i−1, 0) exists (step S604). In the case where N(i−1, 0) exists (Y), the interruption processing is continued as it is to return to the step S106 (FIG. 8). In the case where N(i−1, 0) does not exist (N), j is initially set to 0 (step S605). Then, j+1 is caused to be newly j (step S606) to judge whether or not N(i−j, 1) exists (step S607). In the case where N(i−j, 1) exists (Y), current value is changed into N(i−j, 0), i.e., the interruption processing is interpolated (step S608). Then, whether i=j holds is judged (step S609). If i=j does not hold (N), the operation processing returns to the step S606. In the case where N(i−j, 1) does not exist (step S607; N) and in the case of i=j (step S609;Y), the operation processing returns to the step S106 (FIG. 8). In the case where the interruption switch 17 is turned ON within the prescribed time TS after scene change when OFF state of the interruption switch 17 is continued from the time of scene change by such processing, the interruption switch 17 is assumed to be in ON state from the time of scene change. Thus, the interruption processing is carried out from the time of scene change.

At step S601, when i is greater than the prescribed time TS, N(i, 0) is set (step S610) to carry out interruption processing to return to the step S106 (FIG. 8).

FIG. 15 to 19 show end processing. In this end processing, when scene change signal from the switching precessing section 27 indicating change of scene is inputted, in the case where there exists point or vector interpolated by the interpolation processing from end time of the scene until the time point before predetermined end processing time TE, the interpolation processing is carried out until change of the scene. In this example, the end processing time TE is set to 5 sec.

In this end processing, j is initially set to 0 (step S701) thereafter to allow j+1 to be newly j(step S702) thereafter to judge whether or not i−j is greater than TE (step S703). In the case where i−j is not greater than TE (N), whether or not N(i−j, 0) exists is judged (step S704). In the case where N(i−1, 0) does not exist (N), the operation processing returns to the step S702. In the case where N(i−1, 0) exists (Y), the operation processing proceeds to step S705. Thus, the interpolation processing is carried out with respect to j and values succeeding thereto. Also in the case where i−j is greater than TE (step S703; Y), the processing operation proceeds to the step S705.

At the step S705 and steps subsequent thereto, points interpolated within the end processing time are retrieved. In more practical sense, variable k is set to 0 at the step S705 thereafter to allow k+1 to be newly k (step S706) thereafter to judge whether or not k=j holds (step S707). In the case where k=j does not hold (N), variable q is caused to be q=p(i−k−1) (step S708) to judge whether or not P(i−k−1, q), i.e., interpolated point exists (step S709). If the interpolated point P(i−k−1, q) does not exist (N), q−1 is caused to be newly q (step S710) to judge whether or not q is equal to 0 (step S711). If q is not 0 (N), the operation processing returns to the step S709. If q is equal to 0 (Y), the operation processing returns to the step S706. If the interpolated point P(i−k−1, q) exists (step S709; Y), the operation processing proceeds to the processing shown in FIG. 17. In the case where the interpolated point P(i−k−1, 0) cannot be found so that there results k=j (step S707; Y), the processing operation proceeds to the retrieval processing of the interpolated vector shown in FIG. 16.

Figure 16:
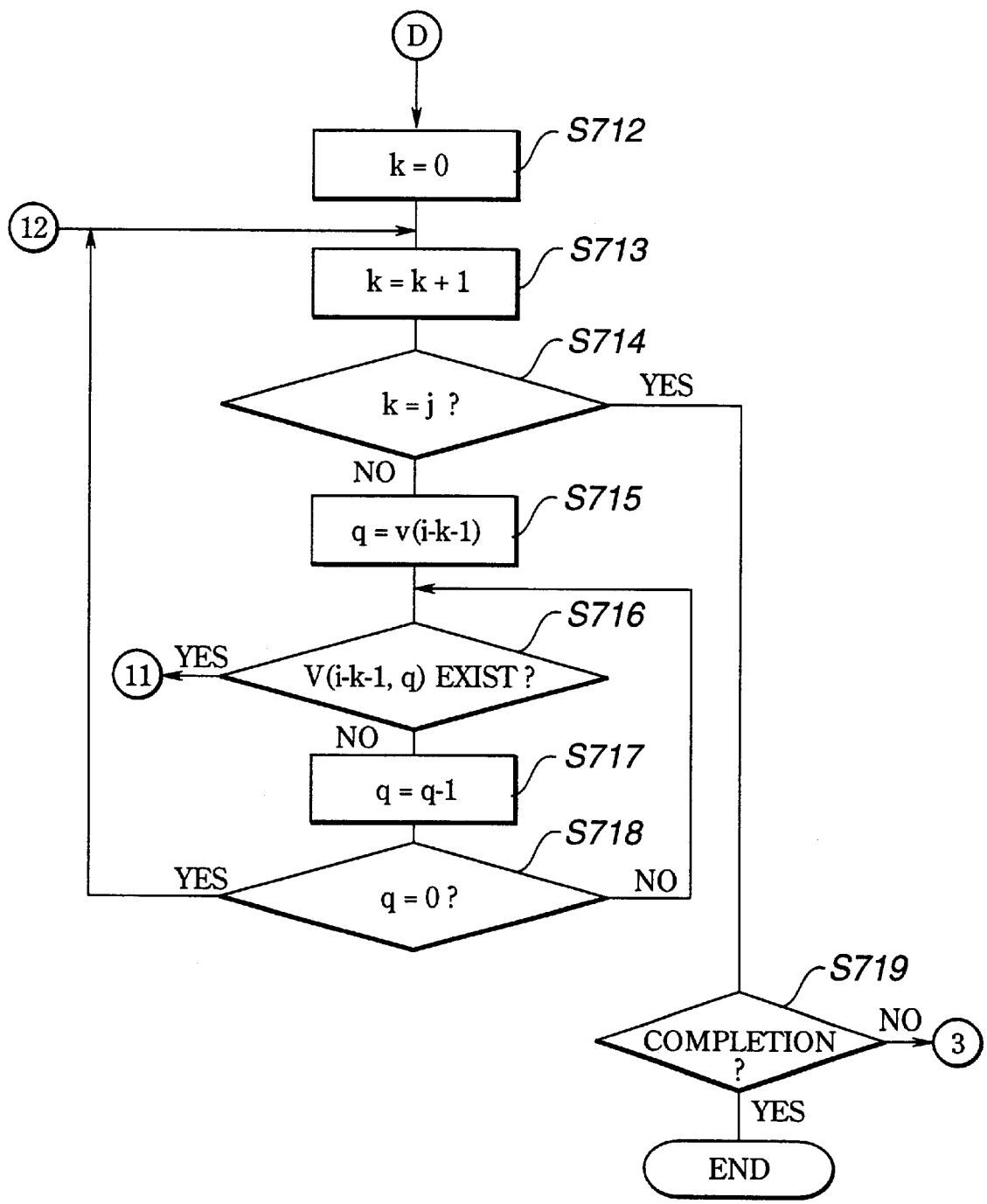
FIG. 16 is a flowchart for explaining the operation of the position processing section in FIG. 1.

In the processing shown in FIG. 16, the interpolated vector within the end processing time is retrieved. In more practical sense, variable k is set to 0 at step S712 thereafter to allow k+1 to be newly k (step S713) thereafter to judge whether or not k=j holds (step S714). In the case where k=j does not hold (N), variable q is caused to be q=v(i−k−1) (step S715) to judge whether or not V(i−k−1, q), i.e., the interpolated vector exists (step S716). If the interpolated vector V(i−k−1, q) does not exist (N), q−1 is caused to be newly q (step S717) to judge whether or not q is equal to zero (step S718). If q is not equal to 0 (N), the operation processing returns to the step S716. If q is equal to zero (Y), the operation processing returns to the step S713. If the interpolated point V(i−k−1, q) exists (step S716; Y), the processing operation proceeds to the processing shown in FIG. 18. In the case where the interpolated vector V(i−k−1, q) cannot be found out so that k=j holds (step S714; Y), whether or not encoding is completed is judged (step S719). In the case where encoding is completed (Y), position processing at the position processing section 21 is completed. In the case where encoding is not completed (N), the processing operation returns to the step S101 (FIG. 8) for position processing in the next scene to clear p(i), v(i), n(i) and i.

Figure 15:
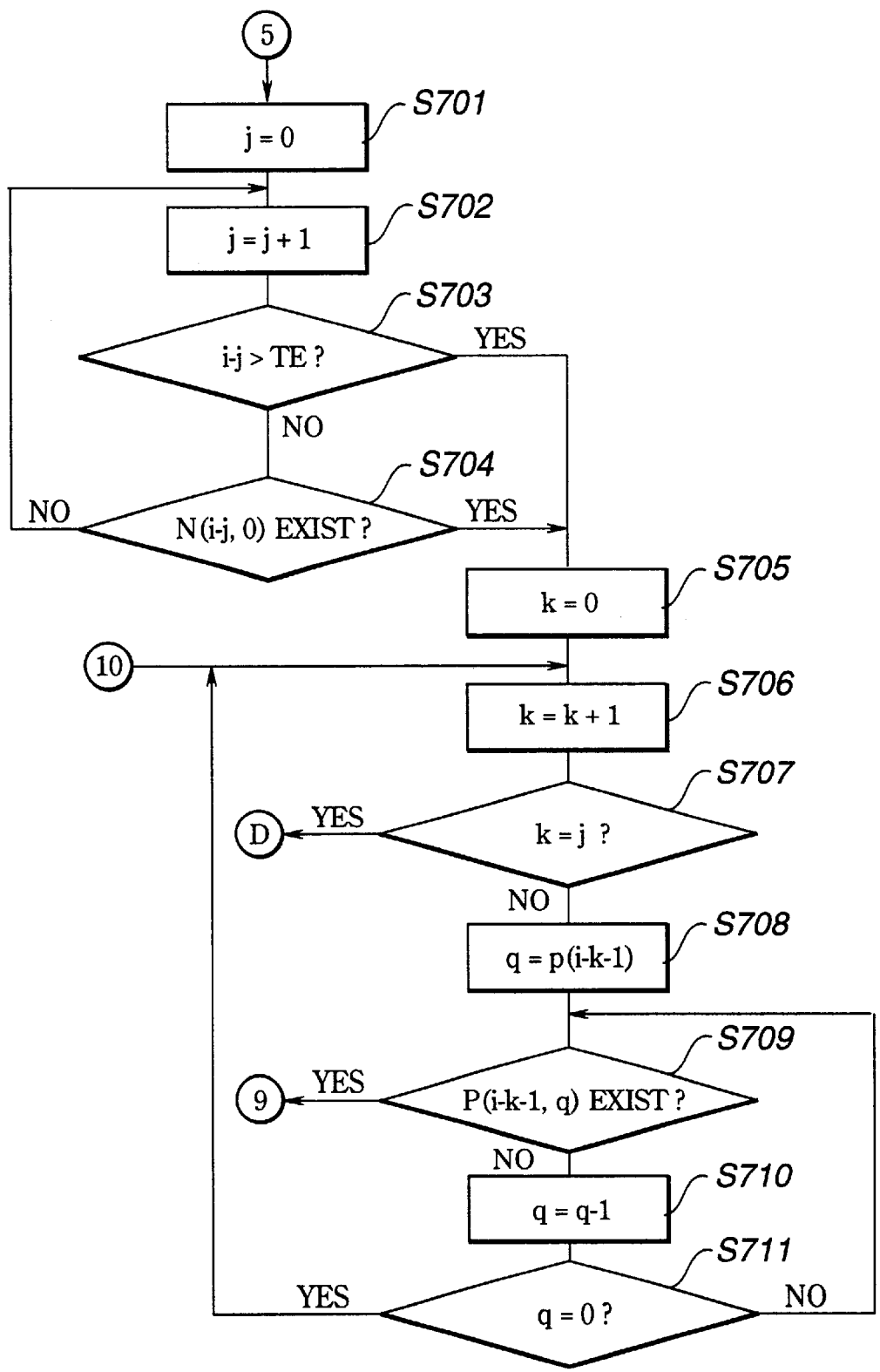
FIG. 15 is a flowchart for explaining the operation of the position processing section in FIG. 1.
Figure 17:
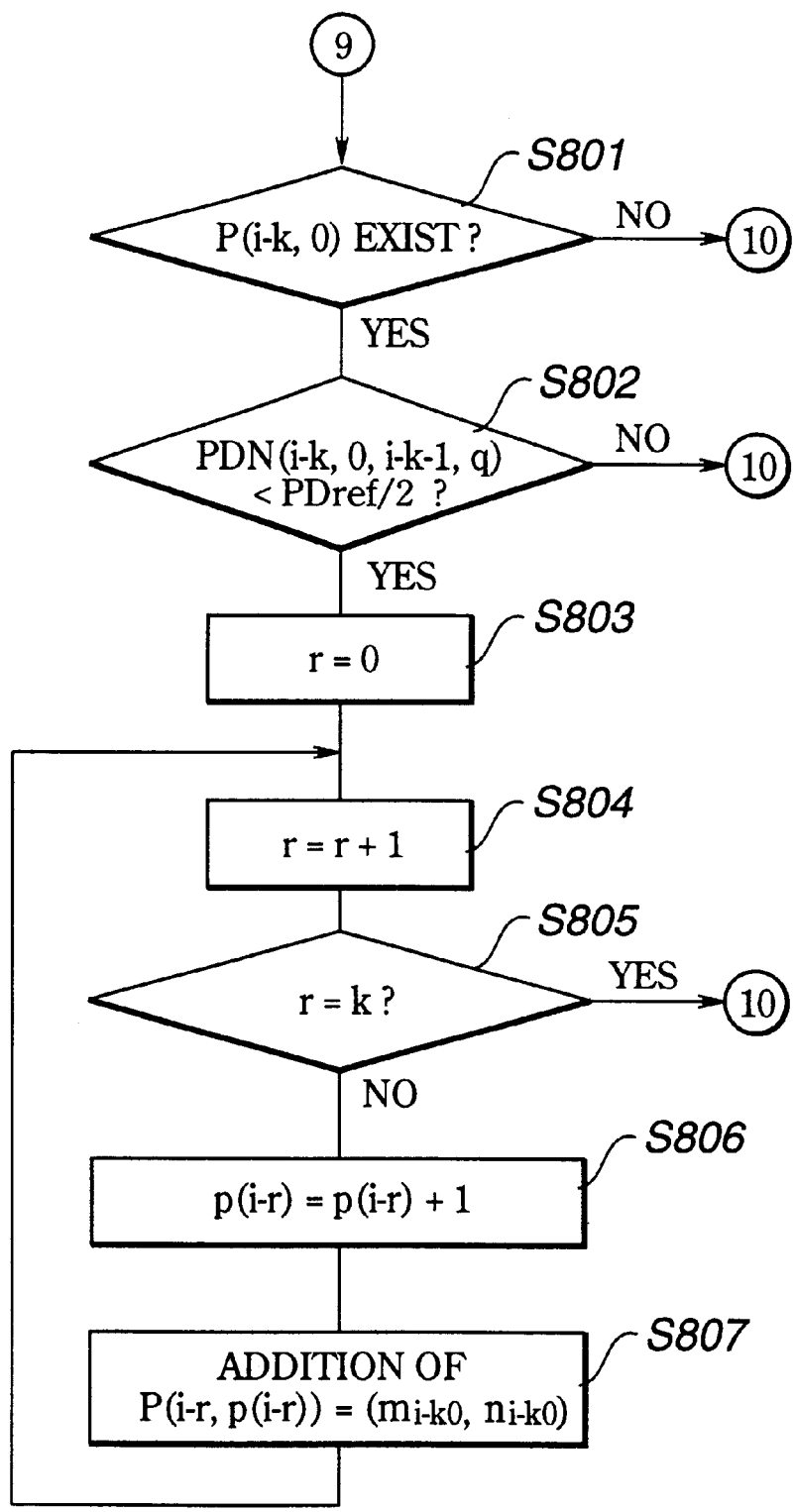
FIG. 17 is a flowchart for explaining the operation of the position processing section in FIG. 1.

In the processing shown in FIG. 17, whether or not there exists non-interpolated point P(i−k, 0) inputted for the next unit time of point P(i−k−1, q) retrieved at the processing shown in FIG. 15 is initially judged (step S801). If that point P(i−k, 0) exists (Y), whether or not distance PDN(i−k, 0, i−k−1, q) between that point and the retrieved point P(i−k−1, q) is smaller than ½ of $PD_{ref}$ is judged (step S802). In this case, PDN is represented by the following formula.

$$PDN(x,y,z,a)=(m_{xz}-m_{yz})^2+(n_{xa}-n_{ya})^2$$

In the case where PDN(i−k, 0, i−k−1, q) is smaller than ½ of $PD_{ref}$ (step S802; Y), it is seen that the interpolated point P(i−k−1, q) is point interpolated by the interpolation processing using non-interpolated point P(i−k, 0). In this case, points of P(i−k, 0) are interpolated until change of scene by the processing of the step S803 and steps subsequent thereto. In more practical sense, variable r is set to 0 (step S803)

thereafter to allow r+1 to be newly r (step S804) to judge whether or not r=k holds (step S805). If r=k does not hold (N), p(i−r)+1 is caused to be newly p(i−r) (step S806), i.e., the number of processing operations is incremented by 1 to allow interpolation value P(i−r, p(i−r)) of point to be the same value ($m_{i-k0}$, $n_{i-k0}$) as the point P(i−k, 0) to add this interpolation value (step S807) to return to the step S804. By repeating the processing of the steps S804 to S807 so that there results r=k, points of P(i−k, 0) are interpolated from the next unit time of the non-interpolated point P(i−k, 0) until change of scene. If there results r=k (step S805; Y), the operation processing returns to the step S706 (FIG. 15).

In the case where non-interpolated point P(i−k, 0) inputted at the next unit time of the retrieved point P(i−k−1, q) does not exists (step S801; N), i.e., in the case where value inputted at the next unit time is only vector or interpolation value, and in the case where PDN(i−k, 0, i−k−1, q) is not smaller than ½ of $PD_{ref}$ (step S802; N), the operation processing returns to the step S706 (FIG. 15) without carrying out the interpolation processing.

Figure 18:
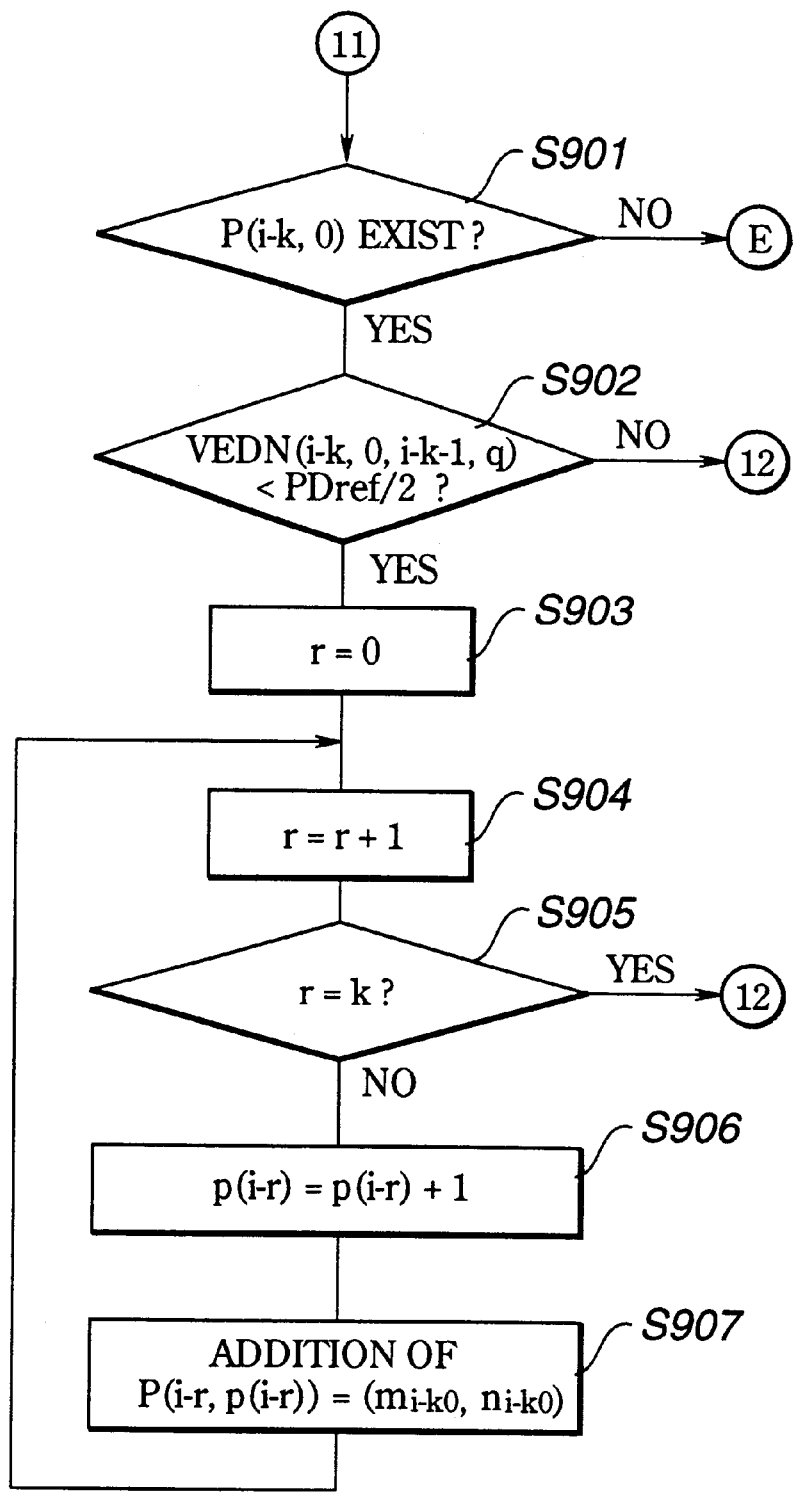
FIG. 18 is a flowchart for explaining the operation of the position processing section in FIG. 1.

In the processing shown in FIG. 18, whether or not non-interpolated point P(i−k, 0) inputted at the next unit time of vector V(i−k−1, q) retrieved by the processing shown in FIG. 16 exists is judged (step S901). If that point P(i−k, 0) exists (Y), whether or not distance VEDN(i−k, 0, i−k−1, q) between that point and end point of the retrieved vector V(i−k−1, q) is smaller than ½ of $PD_{ref}$ is judged (step S902). In this case, VEDN is represented by the following formula.

$$VEDN(x,y,z,a)=(m_{xz}-me_{yz})^2+(n_{xa}-ne_{ya})^2$$

In the case where VEDN(i−k, 0, i−k−1, q) is smaller than ½ of $PD_{ref}$ (step S902; Y), it is seen that the interpolated vector V(i−k−1, q) is vector interpolated by the interpolation processing using non-interpolated point P(i−k, 0). In this case, points of P(i−k, 0) are interpolated until change of scene by the processing of the step S903 and steps subsequent thereto. In more practical sense, variable r is set to 0 (step S903) thereafter to allow r+1 to be newly r (step S904) to judge whether or not r=k holds (step S905). If r=k does not hold (N), p(i−r)+1 is caused to be newly p(i−r) (step S906), i.e., the number of processing operations is incremented by 1 to allow interpolation value P of point (i−r, p(i−r)) to be the same value ($m_{i-k0}$, $n_{i-k0}$) as the point P(i−k, 0) to add this interpolation value (step S907) to return to the step S904. By repeating the processing of the steps S904 to S907 until there results r=k, points of P(i−k, 0) are interpolated from the next unit time of non-interpolated point P(i−k, 0) until change of scene. If there results r=k (step S905; Y), the operation processing returns to the step S713 (FIG. 16).

In the case where non-interpolated point P(i−k, 0) inputted at the next unit time of the retrieved vector V(i−k−1, q) does not exist (step S901; N), the operation processing proceeds to the processing shown in FIG. 19. In addition, in the case where VEDN(i−k, 0, i−k−1, q) is not smaller than ½ of $PD_{ref}$ (step S902; N), the operation processing returns to the step S713 (FIG. 16) without carrying out the interpolation processing.

Figure 19:
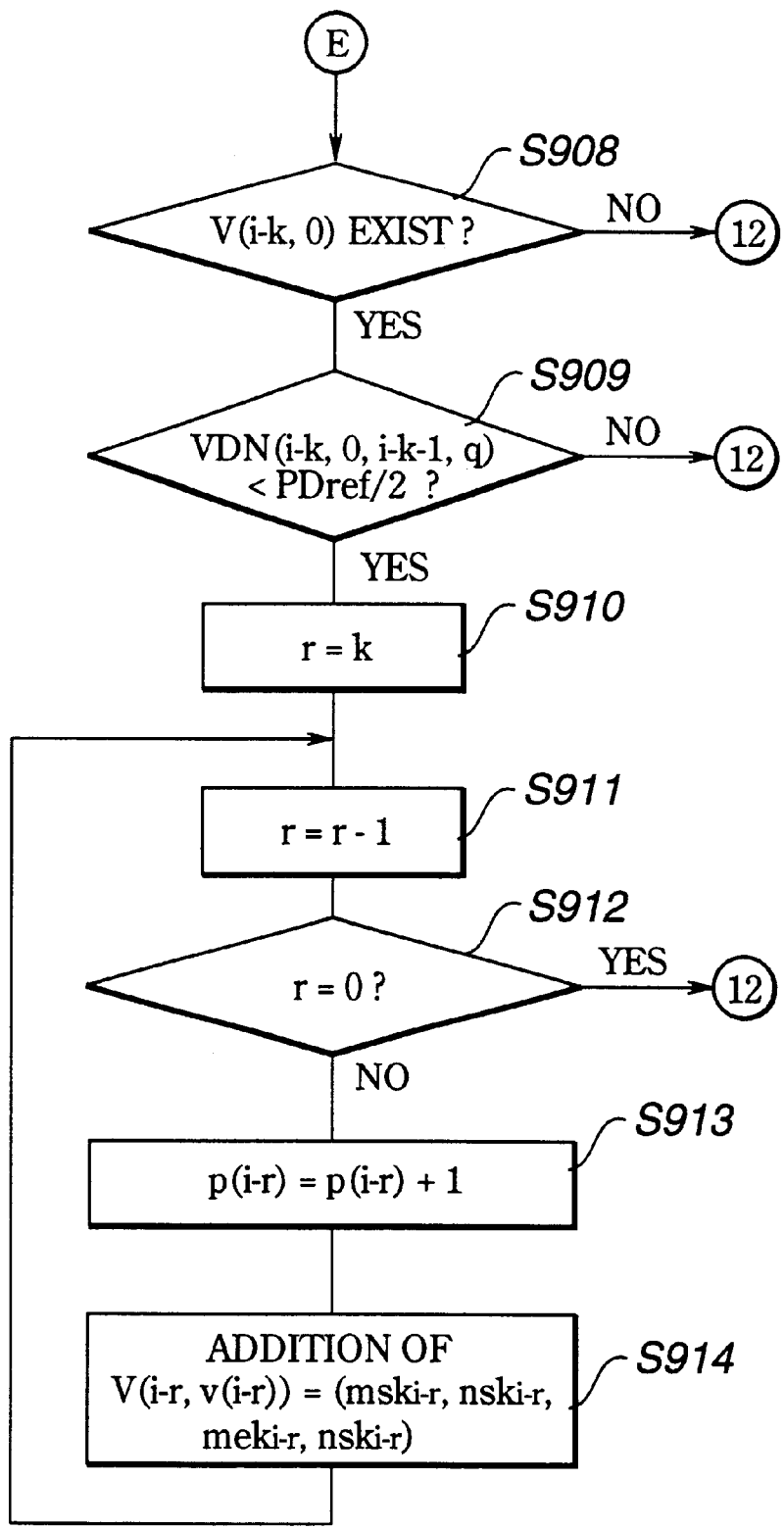
FIG. 19 is a flowchart for explaining the operation of the position processing section in FIG. 1.

In the processing shown in FIG. 19, whether or not there exists non-interpolated vector V(i−k, 0) inputted at the next unit time of vector V(i−k−1, q) retrieved at the processing shown in FIG. 16 is initially judged (step S908). If that vector V(i−k, 0) exists (Y), whether or not distance VDN (i−k, 0, i−k−1, q) between initial point of that vector and end point of the retrieved vector V(i−k−1, q) is smaller than ½ of $PD_{ref}$ is judged (step S909). In this case, VDN is represented by the following formula.

$$VDN(x,y,z,a)=(ms_{xz}-me_{yz})^2+(ns_{xa}-ne_{ya})^2$$

In the case where VDN(i−k, 0, i−k−1, q) is smaller than ½ of $PD_{ref}$ (step S909; Y), it is seen that the interpolated vector V(i−k−1, q) is vector interpolated by the interpolation processing using non-interpolated vector V(i−k, 0). In this case, interpolation of vectors is carried out until change of scene by the processing of the step S910 and steps subsequent thereto. In more practical sense, variable r is set to k (step S910) thereafter to allow r−1 to be newly r (step S911) to judge whether or not r is equal to zero (step S912). If r is not zero (N), p(i−r)+1 is caused to be newly p(i−r) (step S913), i.e., the number of processing operations is incremented by 1 to determine interpolation value of vector V (i−r, v(i−r)) to add this interpolation value of vector (step S914) to return to the step S911. Interpolation value of vector V(i−r, v(i−r)) is represented by the following formula in more practical sense.

$$V(i-r,v(i-r))=(msk_{i-r}, nsk_{i-r}, mek_{i-r}, nek_{i-r})$$

In the above mentioned formula, $$msk_{i-r}=ms_{i-r+1\ v(i-r+1)}-(ms_{i-k0}-m_{i-k0})$$

$$nsk_{i-r}=ns_{i-r+1\ v(i-r+1)}-(ns_{i-k0}-n_{i-k0})$$

$$mek_{i-r}=ms_{i-r+1\ v(i-r+1)}$$

$$nek_{i-r}=ns_{i-r+1\ v(i-r+1)}$$

By repeating the processing of the steps S911 to S914 so that there results r=0, interpolation of vectors is carried out from the next unit time of non-interpolated vector V(i−k, 0) until change of scene. If there results r=o (step S912; Y), the operation processing returns to the step S713 (FIG. 16).

In the case where non-interpolated vector V(i−k, 0) inputted at the next unit time of the retrieved vector V(i−k−1, q) does not exist (step S908; N), i.e., in the case where value inputted at the next unit time is only interpolation value, and in the case where VDN(i−k, p, i−k−1, q) is not smaller than ½ of $PD_{ref}$ (step S909; N), the operation processing returns to the step S713 (FIG. 16) without carrying out the interpolation processing.

As described above, values of points and values of vectors every respective unit times determined by the processing which has been described with reference to FIGS. 8 to 19 are converted into point values every frame, and point values every frame are caused to be central position of the visual point position vicinity area. In this case, value of point at unit time serves as point value every frame as it is. On the other hand, in order to convert value of vector at unit time into point value every frame, it is sufficient to divide vector at unit time into vectors every frame to allow central point between initial point and end point of vector every frame to be point value every frame.

While the position processing at the position processing section 21 has been described as above, size processing at the size processing section 23 is substantially similar to the position processing. Namely, in the size processing, fixed value of size in the visual point position vicinity area at unit time is defined in place of point in the position processing, and change value of size in the visual point position vicinity area at unit time is defined in place of vector in the position processing. Further, also in the size processing, similarly to the case of the position processing, interpolation processing of fixed value and change value of size is carried out. In this example, in the size processing, the point greatly different from the position processing is that since output signal of the size adjust lever 18 is delayed as compared to the operation of the visual point, only values at the latter half portion within the unit time are used to determine fixed value and change value of size. Values of sizes obtained by the size processing are determined so as to correspond to respective center positions (point values every frame) of the visual point position vicinity area determined by the position processing. Accordingly, as information representing the visual point position vicinity area, three-dimensional values (m, n, s) by point (m, n) and size (s) are obtained every frame. In this example, value s of size is set to 0 when the interruption processing is being carried out. The system control section 30 generates code quantity reduction control signal 35 on the basis of information (m, n, s) indicating visual point position vicinity area obtained in this way to send it to the code quantity reduction section 13.

As explained above, in accordance with the picture compression encoding apparatus according to this embodiment, such an approach is employed to detect visual point position of operator to set visual point position vicinity area on the basis of this visual point position and output of size adjust lever 18, thus making it possible to vary allocation of code quantity in dependency upon the area so that code quantity allocated to the area except for the visual point position vicinity area is smaller than code quantity allocated to the visual point position vicinity area. Accordingly, it is possible to compression-encode picture data on the real time basis within a limited code quantity by simple operation, and to obtain picture (image) of high picture quality from a viewpoint of visual sense for user as far as possible at the time of decoding. In addition, only in the case where code quantity per predetermined time by output data of the compressing section 11 is above the prescribed value, processing to vary allocation of code quantity in dependency upon the area is carried out. Accordingly, there is no possibility that when there is margin in the code quantity, the picture quality may be unnecessarily deteriorated. As a result, picture data can be encoded by effectively utilizing limited code quantity, and there can be obtained picture (image) of high picture quality from a viewpoint of visual sense for user as far as possible at the time of decoding.

Moreover, in accordance with the picture compression encoding apparatus according to this embodiment, since size of the visual point position vicinity area can be changed, it is possible to set the area to which large code quantity is allocated so that it has suitable size. Also from this point, picture data can be encoded by effectively utilizing limited code quantity, and there can be obtained picture (image) of high picture quality from a viewpoint of visual sense for user as far as possible at the time of decoding.

Further, in accordance with the picture compression encoding apparatus according to this embodiment, since reduction of code quantity is carried out stepwise from the visual point position vicinity area toward the outside, it is possible to avoid that the boundary portion of the visual point position vicinity area becomes conspicuous.

Further, in accordance with the picture compression encoding apparatus according to this embodiment, since interpolation processing of various points and vectors are carried out, in the case where operator repeatedly carefully observes plural portions within picture in a manner such that the visual point is changed in succession, it is possible to set visual point position vicinity areas continuously in point of time respectively in the vicinity of plural portions which have been carefully observed, and it is possible to set visual point position vicinity area also when the visual point position is not stable before and after change of scene. As a result, it can be prevented that visual point position vicinity areas are intermittently set. Thus, there can be obtained picture (image) of high picture quality from a viewpoint of visual sense for user at the time of decoding.

It is to be noted that this invention is not limited to the above-described embodiments. For example, as the system of encoding in the compressing section 11, other systems may be employed in addition to the system in which DCT processing and bidirectional predictive encoding are used (combined). Further, as the method of reducing code quantity, in addition to the method of decreasing the number of bits allocated to coefficients after undergone DCT processing, other methods, e.g., reduction of pixels, etc. may be employed. In addition, various modifications may be made within the range which does not depart from the gist of this invention.

What is claimed is:

1. A picture compression encoding apparatus comprising:

encoding means for compression-encoding input picture data;

visual point position detecting means for detecting a visual point position within a picture that a viewer is currently observing by monitoring the viewer's eyeball movements;

area setting means for setting a visual point position vicinity area centered on said visual point position detected by the visual point position detecting means; said visual point position vicinity area being an area smaller in size than said picture; and code quantity limiting means for limiting the quantity of code generated by said encoding means to a predetermined quantity by adjusting the quantity of code allocated to the area of said picture outside of said visual point position vicinity area.

2. A picture compression encoding apparatus as set forth in claim 1, wherein the code quantity limiting means decreases. stepwise code quantity allocated to the area except for the visual point position vicinity area toward a direction away from the visual point position vicinity area.

3. A picture compression encoding apparatus as set forth in claim 1, which further comprises selector means for selecting whether or not it is carried out to vary allocation of code quantity in dependency upon area by the code quantity limiting means.

4. A picture compression encoding apparatus as set forth in claim 1, wherein the area setting means is adapted so that when visual point positions are intermittently detected by the visual point position detecting means, visual point position vicinity areas are continuously set between detection time points of respective visual point positions.

5. A picture compression encoding apparatus as set forth in claim 1, wherein the area setting means is adapted so that the visual point position vicinity areas are continuously set for a time period between a time when visual point position is first detected by the visual point position detecting means within picture unit consisting of plural frames or plural fields and a time when the picture unit is started.

6. A picture compression encoding apparatus as set forth in claim 1, wherein the area setting means is adapted so that the visual point position vicinity areas are continuously set for a time period between a time when visual point position is detected last by the visual point position detecting means within picture unit consisting of plural frames or plural fields and a time when the picture unit is completed.

7. A picture compression encoding apparatus comprising:

encoding means for compression-encoding input picture data;

visual point position detecting means for detecting a visual point position within a picture that a viewer is currently observing by monitoring the viewer's eyeball movements;

area setting means for setting a visual point position vicinity area centered on said visual point position detected by the visual point position detecting means; said visual point position vicinity area being an area smaller in size than said picture;

code quantity limiting means for limiting the quantity of code generated by said encoding means to a predetermined quantity by adjusting the quantity of code allocated to the area of said picture outside of said visual point position vicinity area; and area adjustable means for changing the size of the visual point position vicinity area set by the area setting means.

8. A picture compression encoding apparatus as set forth in claim 7, wherein the code quantity limiting means decreases stepwise code quantity allocated to an area except for the visual point position vicinity area toward a direction away from the visual point position vicinity area.

9. A picture compression encoding apparatus as set forth in claim 7, which comprises selector means for selecting whether or not it is carried out to vary allocation of code quantity in dependency upon the visual point position vicinity area by the code quantity limiting means.

10. A picture compression encoding apparatus as set forth in claim 7, wherein the area setting means is adapted so that when the visual point positions are intermittently detected by the visual point position detecting means, visual point position vicinity areas are set continuously in point of time for a time period between detection time points of respective visual point positions.

11. A picture compression encoding apparatus as set forth in claim 7, wherein the area setting means is adapted so that the visual point position vicinity areas are continuously set for a time period between a time when the visual point position is first detected by the visual point position detecting means within picture unit consisting of plural frames or plural fields and a time when the pixel unit is started.

12. A picture compression encoding apparatus as set forth in claim 7, wherein the area setting means is adapted so that the visual point position vicinity areas are continuously set for a time period between a time point when visual point position is detected last by the visual point position detecting means within picture unit consisting of plural frames or plural fields and a time when the picture unit is completed.

13. A picture compression encoding method comprising the steps of:

an encoding step of compression-encoding input picture data;

visual point position detecting step of detecting a visual point position within a picture that a viewer is currently observing by monitoring the viewer's eyeball movements;

an area setting step of setting a visual point position vicinity area centered on said visual point position detected by the visual point position detecting means; said visual point position vicinity area being an area smaller in size than said picture; and a code quantity limiting step of limiting the quantity of code generated at said encoding step to a predetermined quantity by adjusting the quantity of code allocated to the area of said picture outside of said visual point position vicinity area.

14. A picture compression encoding method as set forth in claim 13, wherein, at the code quantity limiting step, a procedure is taken to decrease stepwise code quantity allocated to the area except for the visual point position vicinity area toward a direction away from the visual point position vicinity area.

15. A picture compression encoding method as set forth in claim 13, which further comprises a selection step of selecting whether or not it is carried out to vary allocation of code quantity in dependency upon area by the code quantity limiting step.

16. A picture compression encoding method as set forth in claim 13, wherein the area setting step is such that when the visual point positions are intermittently detected by the visual point position detection step, visual point position vicinity areas are set continuously in point of time for a time period between detection time points of the respective visual point positions.

17. A picture compression encoding method as set forth in claim 13, wherein the area setting step is such that the visual point position vicinity areas are continuously set for a time period between a time when the visual point position is first detected at the visual point position detection step within picture unit consisting of plural frames or plural fields and a time when the picture unit is started.

18. A picture compression encoding method as set forth in claim 13, wherein the area setting step is such that the visual point position vicinity areas are continuously set for a time period between a time when the visual point position is detected last at the visual point position detection step within picture unit consisting of plural frames or plural fields and a time when the picture unit is completed.

19. A picture compression encoding method comprising the steps of:

an encoding step of compression-encoding input picture data;

visual point position detecting step of detecting a visual point position within a picture that a viewer is currently observing by monitoring the viewer's eyeball movements;

an area setting step of setting a visual point position vicinity area centered on said visual point position detected by the visual point position detecting means; said visual point position vicinity area being an area smaller in size than said picture;

a code quantity limiting step of limiting the quantity of code generated at said encoding step to a predetermined quantity by adjusting the quantity of code allocated to the area of said picture outside of said visual point position vicinity area; and an area adjustable step of varying the size of the visual point position vicinity area set by the area setting step.

20. A picture compression encoding method as set forth in claim 19, wherein, at the code quantity limiting step, a procedure is taken to decrease stepwise code quantity allocated to an area except for the visual point position vicinity area toward a direction away from the visual point position vicinity area.

21. A picture compression encoding method as set forth in claim 19, which further comprises a selection step of selecting whether or not it is carried out to vary allocation of code quantity corresponding to area by the code quantity limiting step.

22. A picture compression encoding method as set forth in claim 19, wherein the area setting step is such that when visual point positions are intermittently detected by the visual point position detection step, the visual point position vicinity areas are set continuously in point of time for a time period between detection time points of the respective visual point positions.

23. A picture compression encoding method as set forth in claim 19, wherein the area setting step is such that the visual point position vicinity areas are continuously set for a time period between a time when the visual point position is first detected at the visual point position detection step within picture unit consisting of plural frames or plural fields and a time when the picture unit is started.

24. A picture compression encoding method as set forth in claim 19, wherein the area setting step is such that the visual point position vicinity areas are continuously set for a time period between a time when the visual point position is first detected at the visual point position detection step within picture unit consisting of plural frames or plural fields and a time when the picture unit is completed.

* * * * *